(12) United States Patent
Bittner et al.

(10) Patent No.: US 11,822,899 B2
(45) Date of Patent: *Nov. 21, 2023

(54) BLOCK FLOATING POINT FOR NEURAL NETWORK IMPLEMENTATIONS

(71) Applicant: Microsoft Technology Licensing, LLC, Redmond, WA (US)

(72) Inventors: Ray Bittner, Snohomish, WA (US); Alessandro Forin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,907

(22) Filed: Nov. 20, 2019

(65) Prior Publication Data

US 2020/0159493 A1 May 21, 2020

Related U.S. Application Data

(63) Continuation of application No. 15/592,021, filed on May 10, 2017, now Pat. No. 10,528,321.

(Continued)

(51) Int. Cl.
*G06F 7/483* (2006.01)
*G06F 17/16* (2006.01)
(Continued)

(52) U.S. Cl.
CPC .............. *G06F 7/483* (2013.01); *G06F 5/012* (2013.01); *G06F 7/52* (2013.01); *G06F 7/5443* (2013.01);
(Continued)

(58) Field of Classification Search
CPC .......... G06F 7/483; G06F 17/16; G06F 5/012; G06F 7/49936; G06F 9/3887; G06F 9/3893
See application file for complete search history.

(56) References Cited

U.S. PATENT DOCUMENTS

| 10,528,321 B2 | 1/2020 | Bittner et al. |
| 2004/0255284 A1* | 12/2004 | Kobayashi ............... G06F 8/41 717/151 |

(Continued)

FOREIGN PATENT DOCUMENTS

| CN | 1774709 A | 5/2006 |
| CN | 102378960 A | 3/2012 |
| CN | 102597948 A | 7/2012 |

OTHER PUBLICATIONS

"Search Report Issued in European Patent Application No. 20199056.1", dated Dec. 10, 2020, 8 Pages.

(Continued)

*Primary Examiner* — Matthew D Sandifer
(74) *Attorney, Agent, or Firm* — Klarquist Sparkman, LLP

(57) ABSTRACT

Apparatus and methods are disclosed for performing block floating-point (BFP) operations, including in implementations of neural networks. All or a portion of one or more matrices or vectors can share one or more common exponents. Techniques are disclosed for selecting the shared common exponents. In some examples of the disclosed technology, a method includes producing BFP representations of matrices or vectors, at least two elements of the respective matrices or vectors sharing a common exponent, performing a mathematical operation on two or more of the plurality of matrices or vectors, and producing an output matrix or vector. Based on the output matrix or vector, one or more updated common exponents are selected, and an updated matrix or vector is produced having some elements that share the updated common exponents.

31 Claims, 14 Drawing Sheets

Related U.S. Application Data

(60) Provisional application No. 62/431,364, filed on Dec. 7, 2016.

(51) Int. Cl.

| | | |
|---|---|---|
| *G06F 5/01* | (2006.01) | |
| *G06N 3/063* | (2023.01) | |
| *G06F 7/544* | (2006.01) | |
| *G06F 7/52* | (2006.01) | |
| *G06N 3/084* | (2023.01) | |
| *G06N 3/044* | (2023.01) | |

(52) U.S. Cl.
CPC ............ *G06F 17/16* (2013.01); *G06N 3/063* (2013.01); *G06N 3/084* (2013.01); *G06N 3/044* (2023.01)

(56) References Cited

U.S. PATENT DOCUMENTS

| | | |
|---|---|---|
| 2009/0113169 A1 | 4/2009 | Yang et al. |
| 2009/0240917 A1* | 9/2009 | Fitton ...................... G06F 7/60 712/36 |
| 2010/0191939 A1 | 7/2010 | Tubbs et al. |
| 2017/0250704 A1* | 8/2017 | Piirainen ................. H03M 7/24 |

OTHER PUBLICATIONS

"Office Action Issued in European Patent Application No. 17822831.8", dated May 29, 2020, 5 Pages.

"Office Action Issued in Indian Patent Application No. 201917021586", dated Dec. 7, 2021, 7 Pages.

"Office Action Issued in European Patent Application No. 20199056.1", dated Feb. 18, 2022, 4 Pages.

"First Office Action Issued in Chinese Patent Application No. 201780076041.0", dated Aug. 29, 2022, 34 Pages.

"Second Office Action Issued in Chinese Patent Application No. 201780076041.0", dated Feb. 27, 2023, 31 Pages.

"Notice of Allowance and Search Report Issued in Chinese Patent Application No. 201780076041.0", dated May 11, 2023, 9 Pages.

Liu, et al., "Design of an FPGA-based Double-Precision Floating-point Matrix Multiplier with Pipeline Architecture", in Journal of CAAI Transactions on Intelligent Systems, vol. 7, Issue 4, Aug. 15, 2012, pp. 302-306.

"Notice of Allowance Issued in European Patent Application No. 20199056.1", dated Sep. 19, 2023, 8 Pages.

* cited by examiner $$C = W \times I + B$$

BLOCK FLOATING POINT FOR NEURAL NETWORK IMPLEMENTATIONS

CROSS-REFERENCE TO RELATED APPLICATIONS

This is a continuation of U.S. patent application Ser. No. 15/592,021, filed on May 10, 2017, which application claims the benefit of U.S. Provisional Application No. 62/431,364, filed Dec. 7, 2016. Both applications are incorporated herein by reference in their entirety.

SUMMARY

Methods, apparatus, and computer-readable storage devices are disclosed for block floating-point (BFP) implementations, including use of such BFP implementations in artificial neural networks (NNs). Matrices and vectors storing arrays of mantissa values can share common exponents for two or more elements. For example, all elements in a row, in a column, or an entire array can have varying mantissas and share a common exponent. In some examples, designated combinations and sub combinations of two or more elements of a matrix or vector can share a common exponent. In some examples, an arbitrary combination of two or more elements of a matrix or vector can share a common exponent. In some examples, using a common exponent allows for reduced memory usage, simplified hardware implementation of multipliers and other floating-point matrix processing circuits, energy reduction, and/or improved computational performance with little or no loss of precision. Output matrices and vectors produced by performing mathematical operations with BFP representations can then use updated common exponent(s) and have their mantissas accordingly shifted. Examples of suitable methods and apparatus for selecting updated common exponents are disclosed.

In some examples of the disclosed technology, a neural network includes a plurality of nodes having associated values and being adapted to update at least a portion of the associated node values using operations with BFP representations having individual mantissas and one or more shared common exponents. Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification tasks. In some examples of the disclosed technology, a system includes hardware for implementing BFP neural networks. The hardware can include, but is not limited to, general-purpose processors (including processors implementing vector instruction sets), custom integrated circuits, application-specific integrated circuits (ASICs), programmable logic devices including field programmable gate arrays (FPGAs), graphics processing units (GPUs), neural networking processors, and/or digital signal processing components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, any trademarks used herein remain the property of their respective owners. The foregoing and other objects, features, and advantages of the disclosed embodiments will become more apparent from the following detailed description, which proceeds with reference to the accompanying figures.

DETAILED DESCRIPTION

I. GENERAL CONSIDERATIONS

Figure 1:
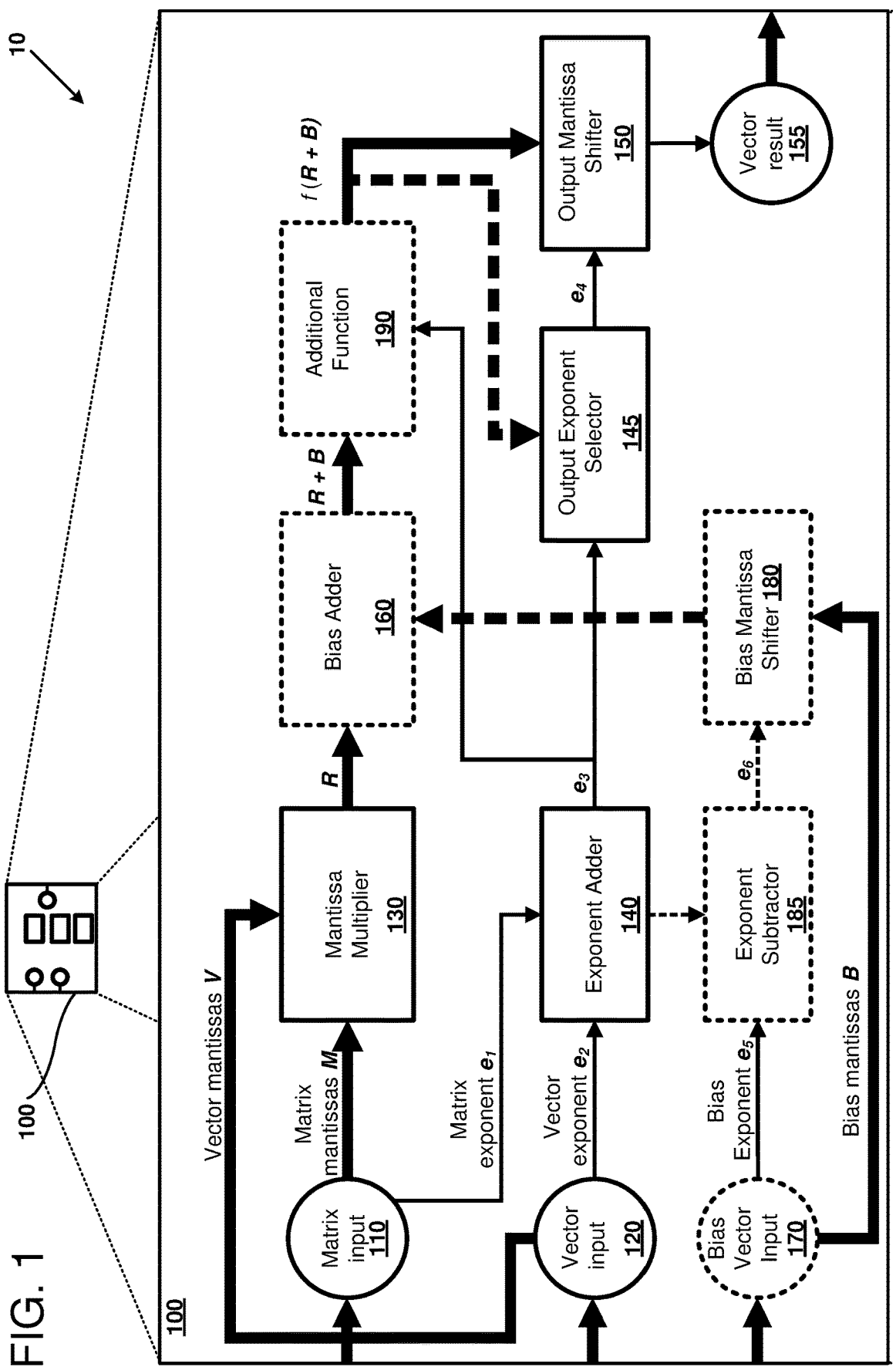
FIG. 1 is a block diagram outlining an example data flow for a block floating-point implementation of a Matrix× Vector multiplication, as can be performed in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "perform," "select," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., with general-purpose and/or specialized processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. INTRODUCTION TO THE DISCLOSED TECHNOLOGIES

Neural networks (NNs) are applied to a number of applications in Artificial Intelligence including image recognition, speech recognition, search engines, and other suitable applications. The processing for these applications may take place on individual devices such as personal computers or cell phones, but it may also be performed in large datacenters. At the same time, Field Programmable Gate Arrays (FPGAs) are being deployed into data centers due to their flexible nature and low power consumption per unit computation.

One of the characteristics of computation on an FPGA device is that it typically lacks hardware floating-point support. Floating-point operations may be performed at a penalty using the flexible logic, but often the amount of logic needed to support floating-point is prohibitive in FPGA implementations. Some newer FPGAs have been developed that do support floating-point computation, but even on these the same device can produce twice as many computational outputs per unit time if it is used in an integer mode. Typically, NNs are created with floating-point computation in mind, but when an FPGA is targeted for NN processing it would be beneficial if the neural network could be expressed using integer arithmetic. Examples of the disclosed technology include hardware implementations of Block Floating Point (BFP), including the use of BFP in NN, FPGA, and other hardware environments.

A typical floating-point representation in a computer system consists of three parts: sign (s), exponent (e), and mantissa (m). The sign indicates if the number is positive or negative. The exponent and mantissa are used as in scientific notation:

$$\text{Value} = s \times m \times 2^e \qquad \text{(Eqn. 1)}$$

Any number may be represented, within the precision limits of the mantissa. Since the exponent scales the mantissa by powers of 2, just as the exponent does by powers of 10 in scientific notation, the magnitudes of very large numbers may be represented. The precision of the representation is determined by the precision of the mantissa. Typical floating-point representations use a mantissa of 24 or 53 bits in width. An integer with magnitude greater than $2^{53}$ can be approximated in floating-point format, but it will not be represented exactly because there are not enough bits in the mantissa. A similar effect can occur for arbitrary fractions where the fraction is represented by bits of the mantissa that take on the value of negative powers of 2. There are many fractions that cannot be exactly represented because they are irrational in a binary number system. More exact representations are possible in both situations, but they may require the mantissa to contain more bits. Ultimately, an infinite number of mantissa bits are required to represent some numbers exactly $$\left(\text{e.g., } \frac{1}{3} = 0.\overline{3}; \frac{22}{7} = 3.\overline{142857}\right).$$

The 24-bit (single precision float) and 53-bit (double precision float) mantissa limits are common compromises of mantissa storage requirements versus representation precision in general-purpose computers.

For purposes of the present disclosure, the term "Block Floating-point" means a number system in which a single exponent is shared across two or more values, each of which is represented by a sign and mantissa pair (whether there is an explicit sign bit, or the mantissa itself is signed). In some examples, all values of one or more rows or columns of a matrix or vector, or all values of a matrix or vector, can share a common exponent. In other examples, the BFP representation may be unsigned. In some examples, some but not all of the elements in a matrix or vector BFP representation may include numbers represented as integers, floating point numbers, fixed point numbers, symbols, or other data formats mixed with numbers represented with a sign, mantissa, and exponent. In some examples, some or all of the elements in a matrix or vector BFP representation can include complex elements having two or more parts, for example: complex numbers with an imaginary component (a+bi, where i= √−1); fractions including a numerator and denominator, in polar coordinates (r, θ), or other multi-component element.

Block Floating-point (BFP) can be used to tradeoff precision and storage requirements, in a fashion that is similar in some respects to normal floating-point. First, rather than storing an exponent with every floating-point number, a group of numbers can share the same exponent. To share exponents while maintaining a high level of accuracy, the numbers should have close to the same magnitude, since differences in magnitude are expressed in the mantissa. If the differences in magnitude are too great, the mantissa will overflow for the large values, or may be zero ("underflow") for the smaller values. Depending on a particular application, some amount of overflow and/or underflow may be acceptable.

The size of the mantissa can be adjusted to fit a particular application. This can affect the precision of the number being represented, but potential gains will come from a reduced representation size. For example, a normal single-precision float has a size of 4 bytes, but for certain implementations of the disclosed technology, only 2 bytes are used to represent the sign and mantissa of each value.

In certain examples of the disclosed technology, the representation expressed in Equation (1) is used to derive the original number from the representation, but only a single exponent is stored for a group of numbers, each of which is represented by a signed mantissa. Each signed mantissa can be represented by 2 bytes or less, so in comparison to four-byte floating-point, the memory storage savings is about 2×. Further, the memory bandwidth requirements of loading and storing these values are also approximately one-half that of normal floating-point.

In some examples of the disclosed technology, a floating-point hardware implementation uses a wide multiplier (24 bits×24 bits), a wide adder (48 bits+48 bits), shifter units, and exponent-handling hardware. With BFP, more narrow multipliers (16 bits×16 bits) and adders (16 bits+16 bits) are employed per parallel instance, all of which can share common exponent handling hardware. This type of topology can be readily mapped to FPGA hardware resources, as well as to vector instruction sets, such as Intel SSE and AVX processor instructions. In some examples, it may even be possible to use 8-bit operands or even smaller signed mantissa representations for further improvement.

Neural network operations are used in many artificial intelligence operations. Often, the bulk of the processing operations performed in implementing a neural network is in performing Matrix×Matrix or Matrix×Vector multiplications. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As discussed herein, BFP techniques can be applied to such operations to reduce the demands for computation as well as memory bandwidth in a given system, whether it is an FPGA, CPU or another hardware platform. As used herein, the use of the term "element" herein refers to a member of such a matrix or vector.

In certain examples of the disclosed technology, all the values of a weight matrix for a neural network are encoded as BFP numbers sharing a common exponent. Using that common exponent, each value of the weight matrix is then represented by a signed mantissa which occupies 2 bytes of memory. Likewise, all of the values of a vector may share a common exponent with 2-byte signed mantissas. This is also a convenient size for certain CPU and FPGA implementations, because CPUs commonly support vector instructions (e.g., AVX instructions provided by Intel and AMD processors), which will operate on 2-byte integers. These vector instructions can be used to perform the multiply accumulate function used to compute the dot product required for each output element of a Matrix×Vector multiplication. For example, using AVX-256 instructions, sixteen such 16-bit multiplications can be performed per instruction, and as AVX-512 instructions, and even larger bit width instructions are developed, even more parallel multiplications can be performed. In the case of an FPGA, it is common for Digital Signal Processors (DSPs) within the FPGA to support 16×16 bit or 18×18 bit integer multiplication in hardware along with a wide accumulator register. These multipliers readily accept the 2-byte signed mantissa format. When computing the output vector for a Matrix×Vector multiplication, the exponent of the output vector is the sum of the exponent of the Matrix and the exponent for the input Vector. Since the exponents are nominally 16-bits or less themselves, this computation is a low-overhead operation on most hardware platforms.

III. EXAMPLE BFP IMPLEMENTATION OF MATRIX×VECTOR MULTIPLICATION

FIG. 1 is a block diagram 10 illustrating data flow within an example BFP implementation 100 of Matrix×Vector multiplication. Note that the Vector input could also be replaced by a Matrix input to perform Matrix×Matrix multiplication:

$$M \times V = R$$

where matrix M is represented by an i×j matrix of signed integer mantissas ($m_{11}$ ... $m_{ij}$) having a single exponent $e_1$, vector V is a j length vector of signed integer mantissas ($v_1$ ... $v_j$) having a single exponent $e_2$, and R is an i length result vector of signed integer mantissas ($r_1$ ... $r_i$) and a single exponent $e_3$.

$$\left( \begin{bmatrix} m_{11} & \cdots & m_{1j} \\ \vdots & \ddots & \vdots \\ m_{i1} & \cdots & m_{ij} \end{bmatrix} * 2^{e_1} \right) \times \left( \begin{bmatrix} v_1 \\ \cdots \\ v_j \end{bmatrix} * 2^{e_2} \right) = \left( \begin{bmatrix} r_1 \\ \cdots \\ r_i \end{bmatrix} * 2^{e_3} \right)$$

In some examples, the mantissas may be unsigned, and the sign component is taken into account outside of the BFP implementation.

As shown in FIG. 1, matrix input 110 includes a set of matrix mantissas M and a single matrix exponent $e_1$. A vector input 120 includes a set of vector mantissas V and a single vector exponent $e_2$. The matrix mantissas M and the vector mantissas V are sent to a mantissa multiplier unit 140. In some examples of the disclosed technology, the matrix input 110 and/or the vector input 120 can be (temporarily) stored in RAM units of an FPGA. For example, Block RAM (Xilinx) or memory blocks (Altera) can be used to store or queue matrices and vectors according to the disclosed examples, including the matrix input 110 and/or the vector input 120. In some examples, the elements of matrices and vectors are stored or queued in RAM in an arrangement to allow for easy access to successive elements being used for a computation, for example, by generating the address with a counter. In some examples, other FPGA memory units, or external memory, are used to store data for matrices and vectors.

The mantissa multiplier unit 130 multiplies the mantissas of the two input matrices and produces a matrix of result mantissas R. In some FPGA examples, the mantissa multiplier unit 130 is implemented with logic in programmable lookup tables (LUTs) of an FPGA. In some examples, an FPGA includes dedicated multiplier or arithmetic and logic unit (ALU) logic that can be performed to perform multiplication. In some examples, digital signal processor (DSP) functions are provided in an FPGA that can be configured to provide multiplication operations. In some examples, the mantissa multiplier unit 130 includes logic to select plural input values from a memory for a series of multiplication operations. The single exponents $e_1$ and $e_2$ are sent to an exponent adder 140 which adds the two exponents and produces a result exponent $e_3$. In some FPGA examples, the exponent adder 140 is implemented with logic in programmable lookup tables (LUTs) of an FPGA. In some examples, an FPGA includes dedicated adder or arithmetic and logic unit (ALU) logic that performs addition for the exponent adder 140. The result exponent result exponent $e_3$ is sent to an output exponent selector 145, producing selected result exponent $e_4$, which is input to an output mantissa shifter 150. The output mantissa shifter 150 accepts the result of the mantissa multiplier R, which may have additional functions performed on it (as explained further below). The result matrix R and the selected result exponent $e_4$ form a vector result 155 which can be output by the BFP unit 100. The result matrix R can be stored in a similar fashion as the input matrices or vectors. Thus, in some FPGA examples, the vector result 155 is stored in RAM within the FPGA providing the BFP implementation 10, while in other examples, the vector result is stored in external RAM coupled to an output of the FPGA.

In other examples, BFP implementations use a general-purpose processor, a digital signal processor (DSP), a graphics processing unit (GPU), a neural network processor (NNP) or other suitable processor. For example, computer-executable instructions for any one of these suitable processors can be provided to implement BPU representations for floating-point operations. In some examples, special-purpose instructions, for example, single instruction multiple data (SIMD) or other vector instructions such as those provided by Intel Advanced Vector eXtensions (AVX) instructions, can be advantageously provided to improve performance of BFP implementations for suitable processors. In some examples, an application-specific integrated circuit (ASIC) is fabricated to implement disclosed BFP operations.

In some examples, and in particular some NN-based examples, it is typical that a bias vector B may be added to the vector result by a bias adder unit 160, producing R+B. Suitable components for performing such an option bias vector addition operation are depicted in dashed lines in FIG. 1: 160, 170, 180, 185, and/or 190, to perform additional operations with the result R and exponent e3. For example, to perform bias addition, optional components 160, 170, 180, and 185 are used. To calculate an additional function, optional component 190 is used. To perform bias addition with an additional function, components 160, 170, 180, 185, and 190 are used. As will be readily understood to one of ordinary skill in the art having the benefit of the present disclosure, operation of other components, such as the exponent adder 140, the output exponent selector 145, and/or the output mantissa shifter 150 may be modified depending on particular operations being performed.

In one example, the mantissas of the input bias vector B 170 are shifted to match the mantissas of the intermediate result vector R by a bias mantissa shifter 180. The exponent $e_3$ produced by the exponent adder 140 can be subtracted from the bias exponent $e_5$ by exponent subtractor 185 to produced exponent $e_6$. The exponent $e_6$ is used by the bias mantissa shifter 180 to align the bias mantissas B to the intermediate result vector mantissas R. The bias adder unit 160 adds the shifted bias vector input B with the output of the mantissa multiplier 130. In this case, the R+B output of the bias adder unit 160 is sent to the output mantissa shifter 150 in order to generate the vector result 155 instead of only the result vector R, as is used in examples without a bias addition.

In some examples, an additional function, such as a linear function, a non-linear function, an activation function, a transfer function, or other function selected for a particular application is applied to the vector result 155 by an additional function unit 190. For example, a sigmoid, hyperbolic tangent (tan h), or other similar function are frequently applied to the vector result 155 in certain NN processing configurations. The additional function unit further accepts the exponent $e_3$ as the exponent for the partial result R+B uses both $e_3$ and the elements of R+B to produce output ƒ(R+B) accordingly. (In examples without a bias vector addition, the output ƒ(R) is produced). In neural network processing examples, the additional function can be an activation function for a node of the neural network. The partial result exponent $e_3$ and optionally the result elements ƒ(R+B) enter the output exponent selector 145 to determine the final output exponent $e_4$. Output exponent $e_4$ may be a fixed value or a function of the elements of $f(R+B)$. The output mantissa shifter 150 aligns the elements of partial result vector $f(R+B)$ to the output exponent $e4$ and produces the final result vector. In some examples, both the bias vector B and the additional function are applied. The bias vector B may be applied before or after application of the additional function. In other examples, only one of the bias vector B or additional function are applied. In other examples, neither a bias vector B nor an additional function is applied. In some examples, the internal operations may be performed with higher precision than the output precision, in order to avoid introducing loss of precision from performing multiple operations using lower bit mantissas and/or exponents.

Values for the mantissas that are sent to the multiplier unit 130 and output as a vector result are not necessarily produced simultaneously and in parallel, but may be produced in a serial fashion. For example, the multiplier unit 130 can include control logic used to sequence selection of elements of input matrices and vectors. The vector result is sampled by the exponent selector unit 190 which produces exponent adjustment signals that are used to adjust the single exponent(s) used for the vector output. In some examples, the exponent selector 190 selects the absolute maximum of the vector result values as the absolute maximum of Equation 2, below, for calculating the shared exponent(s). In some examples, the exponent selector continuously samples mean and standard deviation information from the vector result in order to generate the exponent adjustment signal. For example, the last n input and/or output values can be sampled to provide mean and standard deviation data, where n can be any suitable value, including, but not limited to: 512, 1,024, or 8,192 values. In some examples, table lookups or other techniques disclosed herein can be used to generate the exponent adjustment signal.

As will be readily understood to one of ordinary skill in the relevant art having the benefit of the present disclosure, the matrix multiplication operations discussed above for FIG. 1 are an example operation that can be performed with the BFP unit and can readily modified to perform other operations. For example, matrix division, addition, or subtraction can be performed by modifying the disclosed operations accordingly, for example, by performing exponent subtraction when dividing, or exponent alignment when performing addition or subtraction operations. Further, additional matrix operations can be performed using the disclosed BFP representations and hardware. For example, matrix inversion, matrix transposition, determinant calculation, and other matrix and vector operations can be performed using methods adapted to use disclosed BFP representations and hardware. Modifications to the functions performed by the components in the BFP unit according to various exemplary operations (matrix multiplication M×V, matrix division M÷V, matrix addition M+V, and matrix subtraction M−V, are summarized below in Table 1.

TABLE 1

| Operation | Component | |
|---|---|---|
| | Mantissa Operation | Exponent Operation |
| Matrix multiplication | multiply | adjust exponent |
| Matrix division | divide | adjust exponent |
| Matrix Addition | shift and add | increase exponent |
| Matrix Subtraction | shift and subtract | decrease exponent |

Table 1 shows mantissa and exponent operations performed as part of an overall matrix computation. For example, when performing matrix multiplication, mantissa elements of the input matrices/vectors in the disclosed BFP representations are multiplied and the associated common exponents of the input are adjusted (for example, by adding the two common exponents). These operations are depicted in FIG. 1 as being carried out by the mantissa multiplier 130 and exponent adder 140, respectively. For matrix addition, mantissas of an input matrix/vector are shifted according to the difference in exponents between the two matrices being added. The output exponent is increased accordingly. Similarly, for matrix subtraction, mantissas are shifted and subtracted and the output exponent is adjusted accordingly. In some examples, and as further detailed below, the output exponent may be selected in a more complex manner, to increase overall accuracy of the resulting BFP representation.

As will be readily understood to one of ordinary skill in the relevant art having the benefit of the present disclosure, the BFP implementation of FIG. 1, which shows an example of matrix multiplication with optional use of a bias vector input and an optional additional function, can be adapted to perform other matrix operations including those described in Table 1. For example, It should be noted that some operations may not be performed, depending on the values in the matrices or vectors. For example, when intermediate values can be represented without shifting mantissa or vector shifting or addition, then those values are not shifted for a particular operation. In some examples, the operations selected to be performed and operation of associated components are statically selected. In other examples, the operations can be dynamically selected between individual operations or a set of operations.

Values for the matrices and the shared exponents can be stored in any suitable memory storage device. For example, the matrices and the shared exponents can be stored in an addressable memory (e.g., dynamic random access memory (DRAM, including DDR, DDR2, etc., DRAM), embedded DRAM (eDRAM), or static random access memory (SRAM), an array of latches, an array of flip-flops, a register file, a block random access memory (block RAM) (sometimes called "memory blocks"), a First-In First Out (FIFO) buffer, or a shift register. In some examples, values for the matrices are stored in an addressable memory or register file and values for the shared exponents are stored in a number of flip-flops or latches. Thus, allocating a full memory to store data for the shared exponents may be avoided. In some examples, storage such as flip-flops or registers are allocated to store values for shared exponents statically (e.g., one register stores all the exponent values at a particular stage of BFP processing, or one register is allocated per column/row of the matrix). In some examples, storage is allocated to store the exponents dynamically. In some examples, exponent values can be accessed by performing a table lookup (e.g., by using a row, column pair of a matrix as an index to identify a shared exponent storage location).

One issue that is addressed with the illustrated BFP implementations is the dynamic range of the values that share a common exponent. If all the values grouped under a common exponent are within a relatively narrow dynamic range, the BFP representation works well, with little or no loss of precision in comparison to ideal, infinite precision. If the values have a relatively wider dynamic range, loss of precision can occur. The values represented in a neural network are quite often close in magnitude. For example, the frequently used sigmoid activation function varies from [−1, 1] and on layers where sigmoid is used, the final representation of every output of that layer will fall into that range. One example of a suitable sigmoid activation function is:

$$S(x) = \frac{1}{1+e^{-x}}.$$

However, as will be readily understood to one of ordinary skill in the art having the benefit of the present disclosure, other suitable activation functions can be used. It is also common for the initial inputs to a neural network to be normalized to a small dynamic range or to come from a set of numbers with a small dynamic range, such as pixel RGB values [0, 255]. There are some cases where a narrow dynamic range assumption is not valid for neural networks, and some precision loss will occur. Saturation can be used to mitigate this effect.

IV. EXAMPLES OF COMMON EXPONENT SELECTION

The choice of exponents to use for a group of numbers in BFP representation can affect the precision of calculations using the group of numbers. If the exponent is too large, then many of the mantissa values will underflow with only a few of the lower order bits being non-zero. For example, consider a BFP example where the following values in Table 2 are represented:

TABLE 2

| Decimal Value | 131072 | 256 | 1 | 0.5 | 0.125 |
|---|---|---|---|---|---|
| Ideal Hex Value | 0x20000.0 | 0x0100.0 | 0x0001.00 | 0x0000.8 | 0x0000.2 |
| 16-bit Mantissa (Exp +3) | 0x4000 | 0x0020 | 0x0000 | 0x0000 | 0x0000 |
| 16-bit Mantissa (Exp −3) | 0x0000 | 0x0800 | 0x0008 | 0x0004 | 0x0001 |

In this example, the dynamic range of the values is relatively wide compared to the dynamic range of the mantissa. The familiar representation of each value is shown in the row labeled "Decimal Value," and the exact hexadecimal representation of the same number is shown in the row below it ("Ideal Hex Value"). Two examples of 16-bit BFP representations for the numbers in Table 2 are given. Two choices of exponent, +3 and −3, are shown on the following two lines along with their mantissa equivalents. When the exponent is +3, the two largest values can be represented explicitly with full precision, but the three smaller numbers underflow and are represented simply as 0 (three underlined mantissas 0x0000 in the third row). When the exponent is −3, the largest value overflows and is represented as 0 (underlined mantissa 0x0000 in the fourth row) while all the smaller numbers are faithfully represented.

Thus, in this example, the dynamic range is simply too large for a 16-bit mantissa to capture all of the values accurately. In many cases, it is preferred to underflow rather than overflow, since the underflow values are small and tend to have less of an influence on the results, especially in certain applications such as neural networks. As previously stated, in neural networks the values that are convenient to group under a single exponent tend to have a fairly narrow dynamic range. There are cases where a wide dynamic range does occur, and in those cases, exponent selection can take into account overflow and underflow.

There are several different ways of calculating the best exponent(s) for a BFP representation. When a set of values is given, such as for the primary inputs to a neural network, the maximum and minimum possible values are usually known. For example, it is common for these values to be floats with a range of [0, 1] or integers with a range of [0, 255]. If a 16-bit mantissa is used, then the values can simply be left-aligned within the mantissa by first calculating the bit position of the leading 1 in the maximum value:

$$\text{Absolute Max} = \max_i(|x_i|) \quad \text{(Eqn. 2)}$$

Where the x values $x_i \in \{x1, x2, \ldots, xn\}$ and the inner brackets are the absolute value. Then, the leading one position is calculated as follows, $$\text{Leading One Position} = \lfloor \log_2(\text{Absolute Max}) \rfloor \quad \text{(Eqn. 3)}$$

where the outer brackets indicate the integer floor function. The exponent is then calculated as a function of the Leading One Position and the width of the mantissa:

$$\text{Exponent} = \text{Leading One Position} - (\text{Mantissa Width} - 2) \quad \text{(Eqn. 4)}$$

Using the absolute max for the exponent preserves the most possible bits for number representation without overflowing and allowing room for the sign bit. For example, assuming the Mantissa Width=16, the result of applying Equations 2-4 to an individual value $x_i$ is shown below in Table 3:

TABLE 3

| Absolute Max | Leading One Pos. | Exponent | Signed 16-bit Mantissa | Value Represented |
|---|---|---|---|---|
| 1 | 0 | −14 | 0x4000 | 1 |
| 255 | 7 | −7 | 0x7F80 | 255 |
| 0.49 | −2 | −16 | 0x7D70 | 0.489990234 |
| 3.141593 | 1 | −13 | 0x6487 | 3.14147949 |

To further explain Table 3: column 1 is the absolute maximum of the value (the unsigned value itself) according to Equation 2, column 2 is the bit position of the leading one in relation to the binary point (the base 2 "decimal point") according to Equation 3, and column 3 is the value of the exponent according to Equation 4. For example, for $x_i$=255, the leading one position of the binary representation is 8 bits left of the binary point (bit 7), the exponent is −7, and the resulting signed 16-bit mantissa is 0x7F80. Column 4 contains the hexadecimal value of the signed mantissa after converting the exact number shown in column 1 based on the corresponding exponent. Column 5 contains the actual value represented by the signed mantissa in column 4 and the exponent from column 3.

It should be noted that negative exponents correspond to shifting the mantissa to the right, and positive exponents correspond to shifting the mantissa to the left. By choosing an exponent that preserves the maximum value, some precision is lost, as shown in the Value Represented column for the last two cases, but the actual value represented is close to the starting value.

Thus, methods are disclosed for calculating the exponent given the absolute maximum of the values that are expected. Such a method works well for neural network inputs, and layer outputs that have known output ranges such as sigmoid( ), hyperbolic tangent tan h( ), etc. However, there are cases in which the output range of a function may have a wide dynamic range, leading to the errors in precision discussed above. For example, this may happen if the output of a neural network layer is purely linear with no activation function applied. In such a network layer, the output is a pure Matrix×Vector product.

One way of approaching this problem is to assume worst case input vector values given the known matrix and calculate the extremes of possible output vector values. In practice, this gives poor results because the dynamic range of the output vector is still quite wide. The block floating-point representation can be improved based in part on an understanding of a particular problem being modeled. For example, neural networks operate in part based on statistical outcomes. Thus, it may be acceptable to generate errors, if they only occur rarely. Thus, a modified method involves determination of an exponent for a given output vector that captures the correct result most of the time.

This can be accomplished by calculating the Matrix×Vector product using real input vectors and recording statistics about the possible outputs. By calculating the mean and variance of the absolute value of the outputs across many real input vectors, a statistical confidence interval can be constructed for the real absolute min and max values of the output vector to a desired confidence. Confidence intervals are usually expressed in terms of number of standard deviations from the mean. For example, if we assume the output vector has a mean $\mu=10$ and a standard deviation $\sigma=0.5$:

TABLE 4

| | Low Range | High Range | Confidence |
|---|---|---|---|
| $\mu \pm 1\sigma$ | 10 − 0.5 = 9.5 | 10 + 0.5 = 10.5 | 68.27% |
| $\mu \pm 2\sigma$ | 10 − 1 = 9 | 10 + 1 = 11 | 95.45% |
| $\mu \pm 3\sigma$ | 10 − 1.5 = 8.5 | 10 + 1.5 = 11.5 | 99.73% |
| $\mu \pm 4\sigma$ | 10 − 2 = 8 | 10 + 2 = 12 | 99.99% |

Table 4 illustrates that for a Gaussian distribution, depending on the number of standard deviations offset from the mean, it can be established with known statistical confidence how many values will fall within that range. For example, at $3\sigma$, we know that the absolute value of 99.73% of the values will fall within the range of 8.5 and 11.5.

Therefore, tracking the mean and standard deviation of the absolute value of output vector values allows for control by selecting the breadth of the dynamic range versus the impact of errors introduced. Larger confidence values (fewer errors) correspond to a wider dynamic range in the values, and lower confidence values (more errors) correspond to a narrower dynamic range. The exact values of $\mu$ and $\sigma$ in a given instance will establish choices in dynamic range width versus confidence. Once a given confidence has been chosen, the High Range value ($\mu$ plus a selected multiple of $\sigma$) can then be used as the absolute max in equation (3) to calculate the exponent.

For example, if the 99.73% confidence interval ($3\sigma$) is chosen from Table 4 above with the same mean (10) and standard deviation (0.5) and a mantissa width of 16 bits, the exponent would be calculated as follows:

Absolute Max=$\mu+3\sigma$=10+1.5=11.5

Leading One Position=$[\log_2(11.5)]$=3

Exponent=3−(16−2)=−11

Since there are potentially a large number of output vectors to track, the mean and standard deviation can be tracked in a streaming fashion. This is easily accomplished for the mean by maintaining a running sum across a statistically relevant set of values that are to share a common exponent and dividing by the number of values. In some examples, it may be convenient if the number of values is a power of 2 since the division may be performed by a shift operation. The standard deviation can be calculated in a running fashion by making use of the following equality:

$$\sigma(X) = \sqrt{E(X^2) - (E(X))^2} \qquad \text{(Eqn. 5)}$$

The expected value of X, denoted E(X) is the mean, $\mu$. $E(X^2)$ is the expected value (or mean) of $X^2$, which can be calculated using the same procedure as used for the mean, but using the squared $X^2$ values. In some examples of the disclosed technology, two running sums of values (e.g., the most recent 512, 1,024, 8,192, or other number of values) are maintained, one across the X values and the other across the X values squared. For example, the two running sum values can be maintained in registers implemented with chained latches, flip-flops, or memory. At the end of a run, the X sum is divided by the number of values, (using a divider or a shifter), which gives the mean E(X). The sum of the $X^2$ values is divided in a similar fashion, which gives $E(X^2)$. The value $\sigma(X)$ can be calculated using E(X), $E(X^2)$, and Equation 5.

As will be readily understood to one of ordinary skill in the art having the benefit of the present disclosure, a similar method of exponent selection can be applied to the Matrix×Matrix case. Further, selection of the number of values to be grouped under a single exponent can be adjusted. Thus, while the foregoing examples are framed in terms of an entire output vector sharing the same exponent, there are numerous considerations for different applications that may make different groupings more advantageous. For example, individual rows of one or more matrices can be associated with a single exponent. In other examples, two-dimensional portions of a matrix can be associated with a single exponent, matrix diagonals, or other suitable demarcations for associating portions of a matrix or matrices with an exponent can be implemented.

V. EXAMPLE NEURAL NETWORK MULTIPROCESSOR

Figure 2:
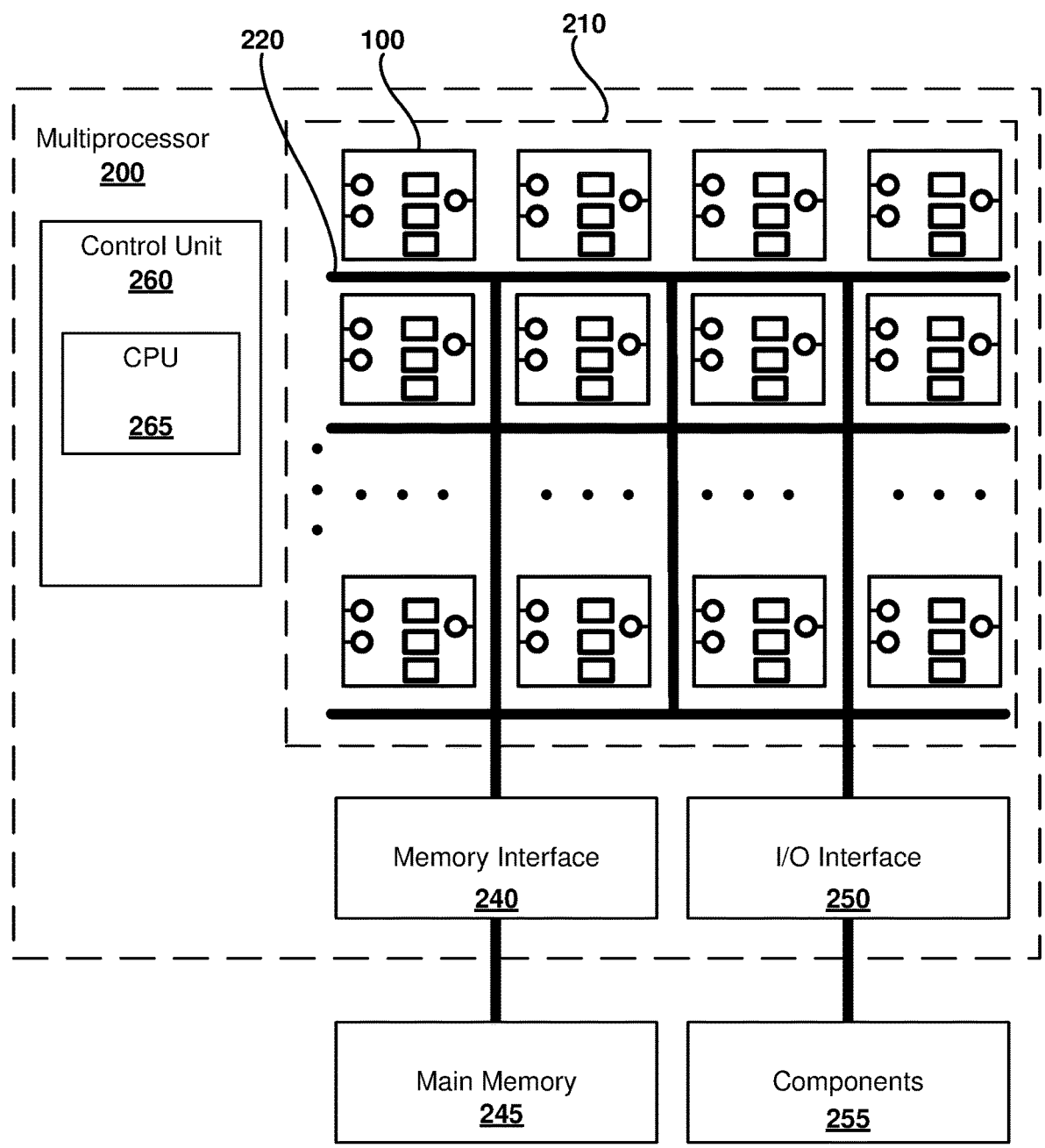
FIG. 2 is a block diagram outlining an example multi-processor including a plurality of neural network cores, as can be implemented in certain examples of the disclosed technology.

FIG. 2 is a block diagram of a neural network multiprocessor 200, as can be implemented in some examples of the disclosed technology. The multiprocessor 200 includes a plurality 210 of one or more neural processing cores, including individual NN processor cores that include one or more BFP units (e.g., BFP unit 100). The multiprocessor 200 can be implemented in as a custom or application-specific integrated circuit (e.g., including a system-on-chip (SoC) integrated circuit), as a field programmable gate array (FPGA) or other reconfigurable logic, or as a soft processor virtual machine hosted by a physical, general-purpose processor.

For example, a general-purpose processor supporting vector instructions, such as x86_64 processors supporting SSE, SSE2, or AVX instructions sets, can be used to implement BFP units.

As shown in FIG. 2, the plurality 210 of neural processor cores are connected to each other via interconnect 220. The interconnect 220 carries data and control signals between individual ones of the cores, a memory interface 240, and an input/output (I/O) interface 250. The interconnect 220 can transmit and receive signals using electrical, optical, magnetic, or other suitable communication technology and can provide communication connections arranged according to a number of different topologies, depending on a particular desired configuration. For example, the interconnect 220 can have a crossbar, a bus, a point-to-point bus, or other suitable topology. In some examples, any one of the plurality 210 of cores can be connected to any of the other cores, while in other examples, some cores are only connected to a subset of the other cores. For example, each core may only be connected to a nearest 4, 8, or 20 neighboring cores. The interconnect 220 can be used to transmit input/output data to and from the cores, as well as transmit control signals and other information signals to and from the cores. For example, each of the cores can receive and transmit semaphores that indicate the execution status of operations currently being performed by each of the respective cores. Further, matrix and vector values can be shared between cores via the interconnect. In some examples, the interconnect 220 is implemented as wires connecting the cores and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the multiprocessor 200 are not limited to full swing electrical digital signals, but the processor can be configured to include differential signals, pulsed signals, or other suitable signals for transmitting data and control signals.

In the example of FIG. 2, the memory interface 240 of the multiprocessor includes interface logic that is used to connect to memory 245, for example, memory located on another integrated circuit besides the multiprocessor 200 (e.g., the memory can be static RAM (SRAM) or dynamic RAM (DRAM)), or memory embedded on the same integrated circuit as the processor (e.g., embedded SRAM or DRAM (eDRAM)). The memory interface 240 and/or the main memory can include caches (e.g., n-way or associative caches) to improve memory access performance. In some examples the cache is implemented using static RAM (SRAM) and the main memory 245 is implemented using dynamic RAM (DRAM). In some examples the memory interface 240 is included on the same integrated circuit as the other components of the multiprocessor 200. In some examples, the memory interface 240 includes a direct memory access (DMA) controller allowing transfer of blocks of data in memory. In some examples, the memory interface 240 manages allocation of virtual memory, expanding the available main memory 245. In some examples, a programming information (e.g., a configuration bitstream) can be stored in the memory 245 and then applied to configure reconfigurable logic resources of the plurality 210 of neural processing cores.

The I/O interface 250 includes circuitry for receiving and sending input and output signals to other components 255, such as hardware interrupts, system control signals, peripheral interfaces, co-processor control and/or data signals (e.g., signals for a graphics processing unit, floating-point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 240. In some examples the I/O signal implementation is not limited to full swing electrical digital signals, but the I/O interface 250 can be configured to provide differential signals, pulsed signals, or other suitable signals for transmitting data and control signals.

The multiprocessor 200 can also include a control unit 260. The control unit 260 supervises operation of the multiprocessor 200. Operations that can be performed by the control unit 260 can include allocation and de-allocation of neural processing cores for performing operations, including matrix and vector multiplication, control of input data and output data between any of the cores, the memory interface 240, and/or the I/O interface 250, modification of execution flow other changes in control flow. The control unit 260 can including a general-purpose central processing unit 265 (e.g., an ARM, MIPS, or x86-64 processor) to implement some or all of the control functions of the control unit 260. For examples, instructions stored in memory can be executed by the CPU 265 to allocate, de-allocate, and send data to one or more of the plurality 210 of neural processing cores.

In some examples, the control unit 260 is implemented at least in part using one or more of: hardwired finite state machines, programmable microcode, programmable gate arrays, or other suitable control circuits.

VI. EXAMPLE SYSTOLIC ARRAY MATRIX OPERATIONS

Figure 3A:
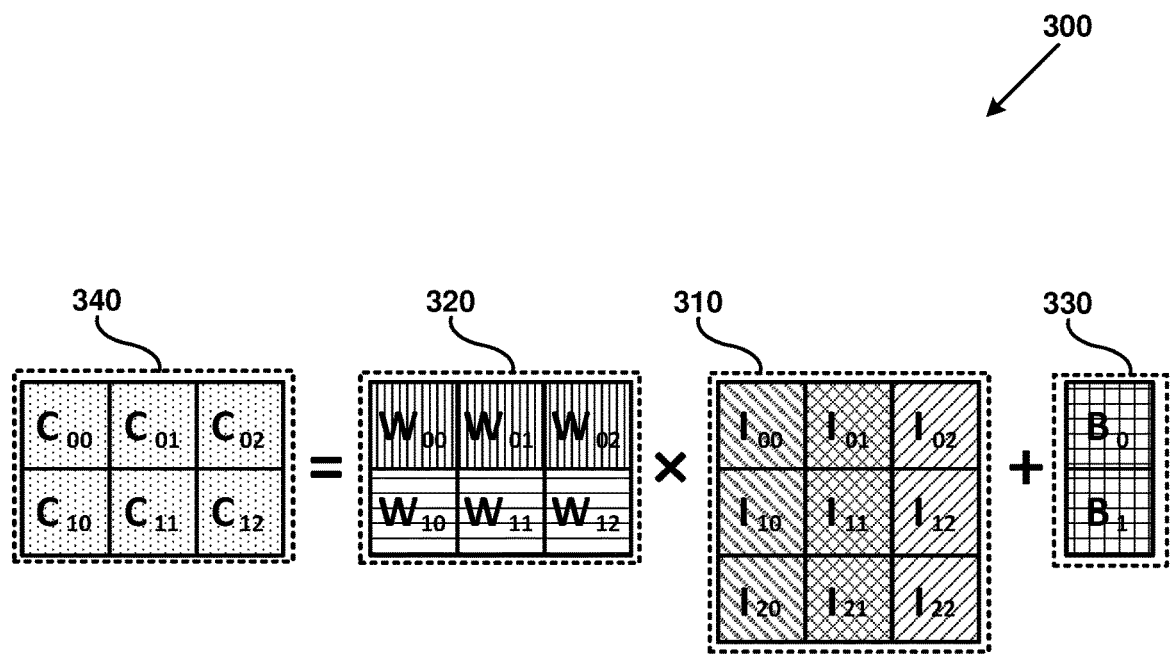
FIGS. 3A and 3B are a diagram outlining operations performed during a systolic array matrix multiplication operation, as can be performed in certain examples of the disclosed technology.

FIG. 3A is a diagram 300 illustrating an example of matrix multiplication with bias vector addition, as can be performed in certain examples of the disclosed technology. For a given input matrix I 310, a set of weights in a matrix W 320 are multiplied times the input matrix, and a bias vector B 330 is added, thereby producing a result matrix C 340.

Figure 3B:
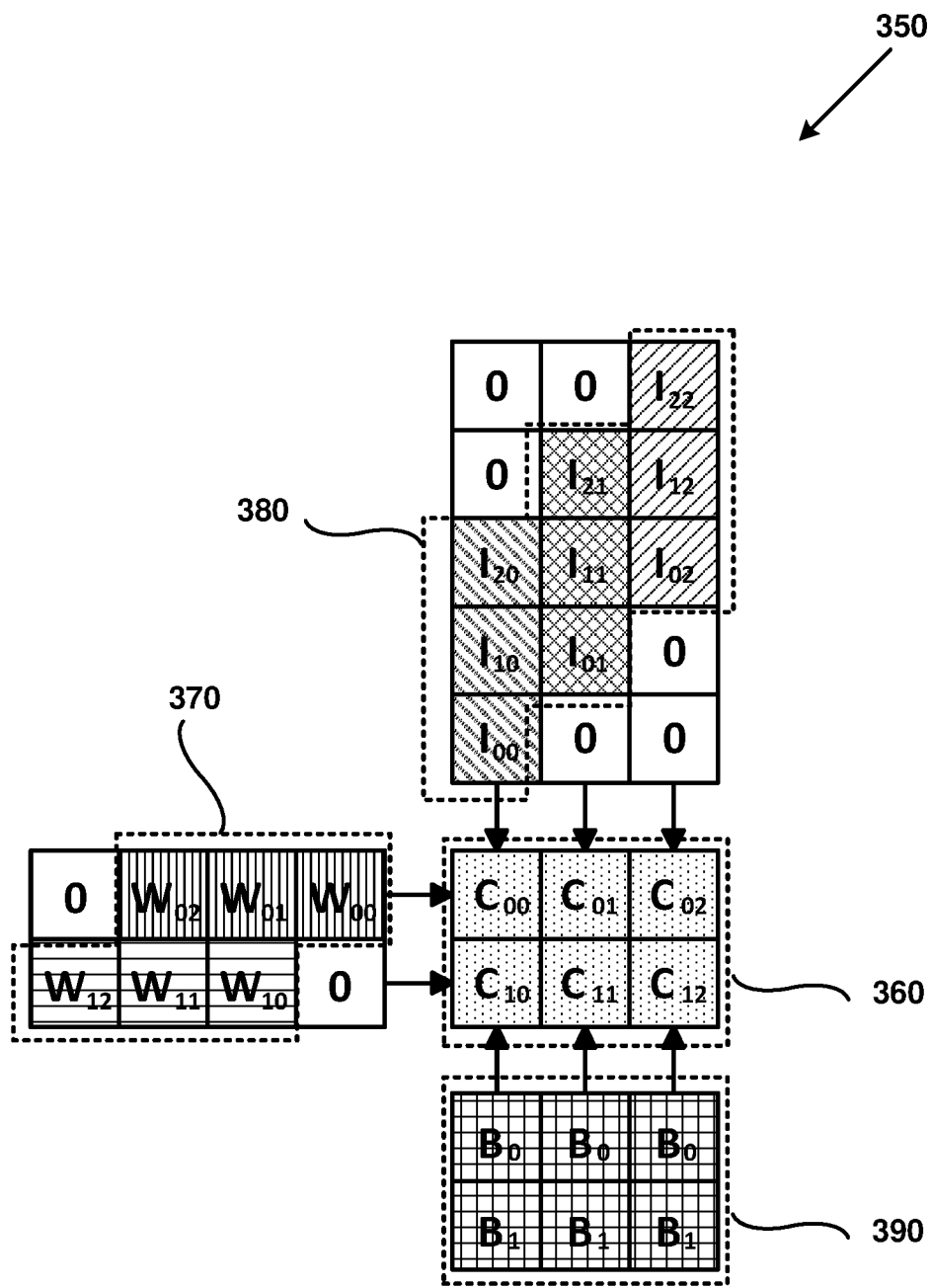

FIG. 3B is a diagram 350 depicting six values of the matrix ($C_{00}$ ... $C_{12}$ 360), are produced by multiplying six values from the weight matrix W 370 times nine values from the input matrix I 380 and adding six values from the bias vector B 390. In practice, there is a multiply accumulate unit at each of the output matrix locations $C_{00}, C_{01}, \ldots, C_{12}$. The accumulator for each is initialized to 0. On each time step, the rows of I are advanced downward and the columns of W are advanced to the right. As each pair of W and I elements collide in the multiplier matrix C, they are multiplied and accumulated in that location. For example, the first pair of elements to collide will be $W_{00}$ and $I_{00}$ at time 1 at location $C_{00}$. At time 2, elements $W_{01}$ and $I_{10}$ will collide at $C_{00}$ and their product will be added to the accumulator. At time 3 the same will happen with $W_{02}$ and $I_{20}$. By time 4, all element pair multiplications required to compute $C_{00}$ will have occurred, and the accumulator will hold the dot product of the first row of W and the first column of I. Similarly, the other 5 elements of C that are shown will be computed as their respective elements collide and are multiplied. After the last pair of elements has been multiplied ($W_{12}$ and $I_{22}$), the multiplication of weight matrix W times column vector I is complete and the accumulators hold the output matrix.

The last step is to add the bias vector B to each column of the matrix in order to produce the final value of C.

Figure 4:
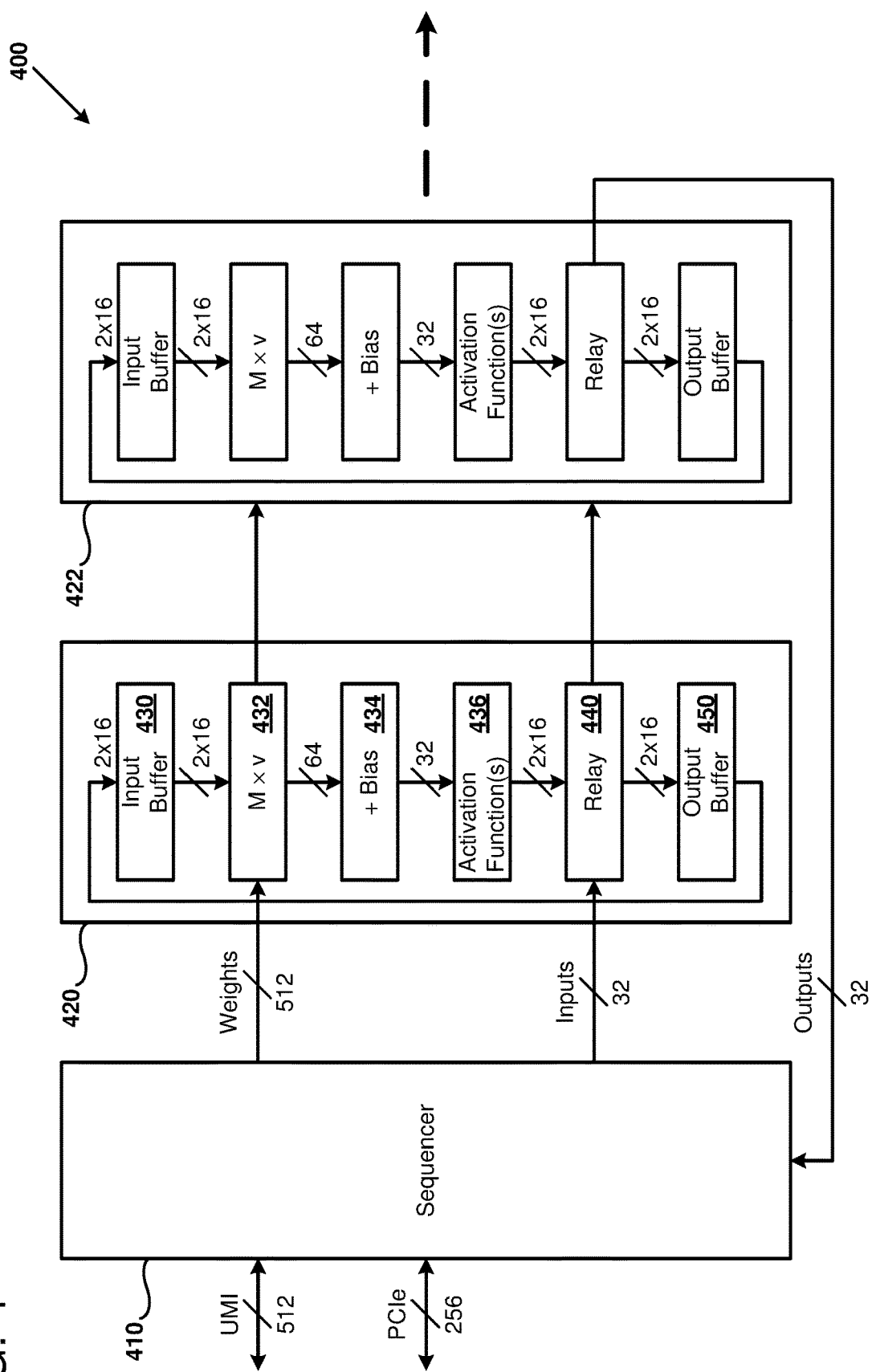
FIG. 4 is a block diagram depicting a hardware for performing matrix multiplication according to certain examples of the disclosed technology.

It is possible for the multiplication to be performed for sub regions of the output matrix C by the systolic array multiplier in different passes. The resources of the FPGA limit the number of multiplications that may occur per clock cycle, which forces us to make this concession. In our case, each column (as shown in FIG. 4 as 420 and 422) corresponds to one column of the output matrix C. Each of these columns (420, 422 and so on) performs 32 multiplications in parallel, two for each of 16 rows of the output matrix. So in effect, each pass through each column (420, 422) of the exemplary disclosed implementation is calculating a 16 row by 1 column portion of the output matrix C.

As will be readily understood to one of ordinary skill in the relevant art having the benefit of the present disclosure, the matrix multiplication operations discussed above for FIGS. 3A and 3B are an example application and can readily modified to perform other operations. For example, matrix division, addition, or subtraction can be performed by modifying the disclosed operations accordingly, for example, by performing exponent subtraction when dividing, or exponent alignment when performing addition or subtraction operations. Further, additional matrix operations can be performed using the disclosed BFP representations and hardware. For example, matrix inversion, matrix transposition, determinant calculation, and other matrix and vector operations can be performed using methods adapted to use disclosed BFP representations and hardware.

VII. EXAMPLE HARDWARE FOR SYSTOLIC ARRAY MATRIX MULTIPLIER

FIG. 4 is a block diagram 400 illustrating an architectural view of a systolic array matrix multiplier as can be used in certain examples of the disclosed technology. As shown, a sequencer 410 is used to provide weights and inputs to a first multiplier column 420. The first multiplier column 420 computes either part or all of a column of the output matrix C from the previous example. The multiplier columns can also be duplicated to compute part or all of additional columns of the output matrix C in parallel. For example, the first multiplier column 420 receives elements of the W matrix from the sequencer 410 and may pass them to the second multiplier column 422. In some examples, only a single multiplication column 420 is provided. The multiplication column includes a two-input 16-bit input buffer 430, containing a single column of the I matrix, a column of 16 DSP units (M×V) which form the systolic array column, two 32-bit inputs, 16-bit multiplier unit 432, a bias adder unit 434, which adds the bias vector to the multiplier results, and a 32-bit activation function 436. The activation function 436 is applied to the result of M×V+B. The activation function 436 is sent to a relay 440, which can send output values to the relay unit of the next column. The relay can also send a pair of 16-bit outputs to the output buffer 450, which can then be re-input back to the input buffer 430. As shown, the weight matrix enters from the left from the sequencer 410 on a dedicated 512-bit path with no flow control. Each input column vector of I for the systolic array matrix multiplication function enters the top of each column and the outputs that are produced can be circulated back to the top for calculating the next layer in the neural network, if there are more layers to process. If the last layer of the neural network has been computed, the outputs may instead be sent to the relay 440 of the next column 422, which then forwards them to successive columns until they reach the sequencer 410. The single 32-bit relay path can be used to move input, output, bias, and other associated values into and out of the multiplication columns.

Figure 5:
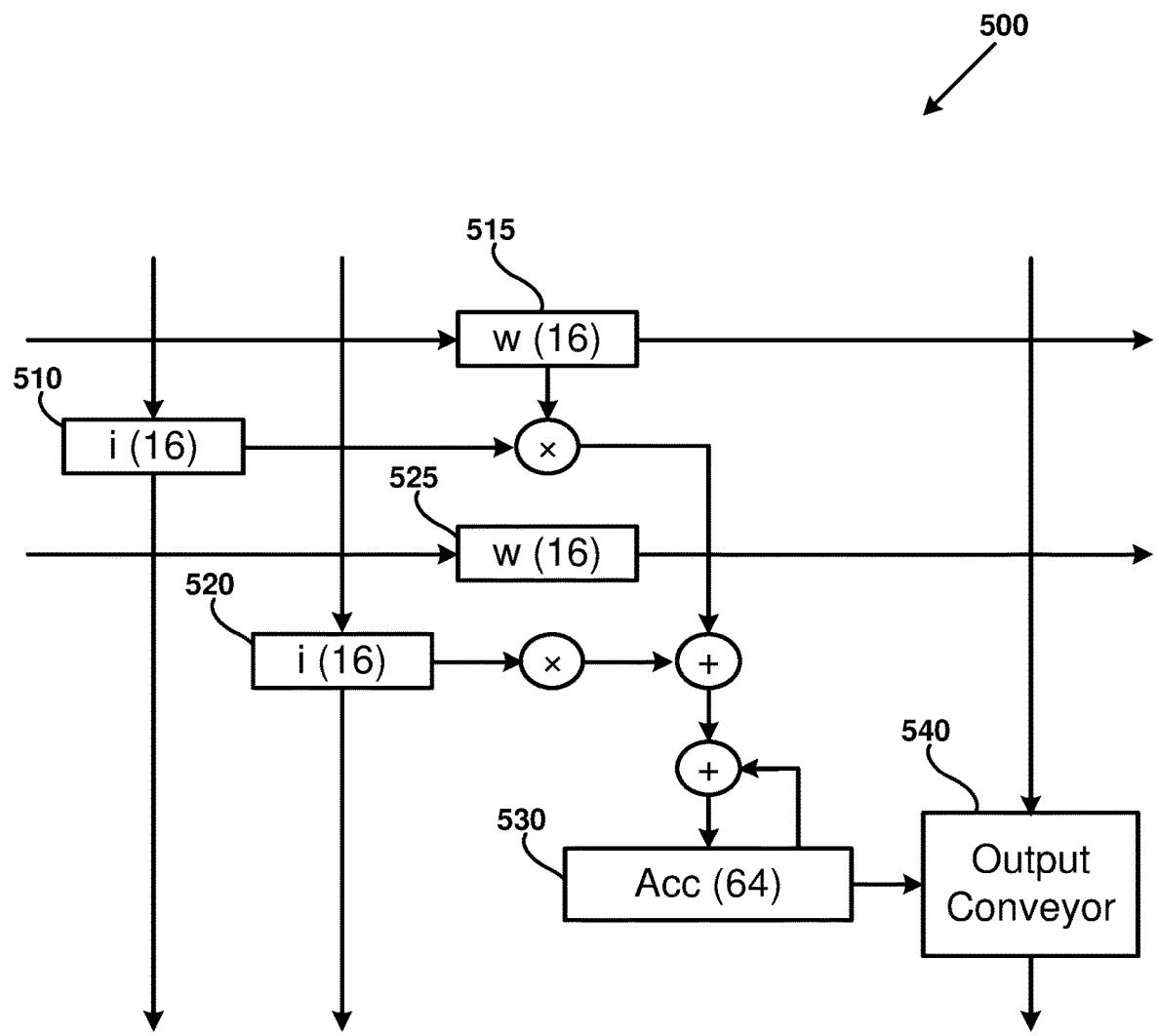
FIG. 5 is a block diagram outlining an example digital signal processing block, as can be used in certain examples of the disclosed technology.

In some examples of the disclosed technology, an M×V systolic array multiplier column 432 is implemented by configuring an Altera FPGA DSP primitive shown in FIG. 5. DSP units are logically arranged as a vertical column so that the weight data W can pass horizontally across the column as the input data is passed vertically down the column. Each DSP unit multiplies two pairs of 16-bit mantissas on each clock cycle and simultaneously adds the results of the previous clock cycle's pair of multiplies to a 64-bit accumulator 530. Hence, each DSP consumes two row elements of weight matrix W and two column elements of column vector I on every clock cycle, and the 64-bit accumulator 530 will contain one element of the output matrix by the end of the operation. Since there are 16 DSPs stacked vertically, there are 16×2=32 elements of the W matrix consumed per clock cycle, for a total of 32×16-bits=512-bits of W matrix data consumed per clock cycle. In selected FPGAs, this matches the native external DDR memory bandwidth of the target FPGA.

The input buffer 430 and output buffer 450 are both constructed from Altera memory blocks. Certain implementations take advantage of dual-ported Altera memory blocks, allowing simultaneous reads and writes to the memory from two sources. As a result, it is possible to use a single larger memory block structure to house both the input buffer 430 and the output buffer 450. Using a single larger memory block can afford more flexibility in the use of the memory since the programmer may then make more efficient use of the memory in the event that either the input or output data is smaller. The result is that fewer FPGA memory block resources in total are needed to implement the same function.

The relay 440 is an example of a ring network on chip. There are many ways that data could be moved between the sequencer 410 and the columns 420 and 422, but having a single ring network uses fewer resources than some other implementations. In some examples, the ring network communication bandwidth may be lower than other relay implementations, but in certain applications, the compute time is relatively long compared to the time it takes to transfer data to/from the columns 420 and 422 via the ring network. Further, it is possible to transmit output data from the columns 420 and 422 as each set of outputs is produced from the column, rather than waiting until the entire computation is complete. This allows pipelining of output data transmission with computation, and effectively mitigates the longer data transmission time. In some examples where the same data must be sent to all columns, such as for bias data, the relay network can be configured to support broadcast so that the same data may be sent to all columns with a single transmission from the sequencer, which further reduces communication delays.

VIII. EXAMPLE DIGITAL SIGNAL PROCESSING TILE FOR PERFORMING MATRIX OPERATIONS

FIG. 5 is a block diagram 500 outlining an example digital signal processing (DSP) tile that can be used to perform matrix multiplication operations according to the disclosed technologies. As shown, a first 16-bit input i 510 is multiplied by a first 16-bit weight input w 515. A second 16-bit input i 520 is multiplied by the second 16-bit weight w 525. The result of the two multiplications are added and can optionally be added to an additional bias amount and stored in a 64-bit accumulator Acc 530. After a number of iterations of multiplication are performed with the DSP tile, the output is provided to an output conveyor 540 that can send the output to other matrix columns or output the result as the matrix multiplication result. All of the functions shown in FIG. 5 can be provided by a single DSP tile in an FPGA or an ASIC, including the output conveyer 540. In other examples, the output conveyor 540 is provided as additional logic connected to the output of the DSP tile. It should be noted that none of the crossing lines depicted in FIG. 5 represent connections.

The Altera DSP blocks are structured such that both multiplications and their sum are all performed in a single clock cycle, and the accumulate operation requires a second clock cycle. As a result, the DSP multiply-accumulate operation has a latency of two clock cycles. However, the multiply+sum operation may be pipelined with the accumulate operation so that two input-weight pairs may be accepted on every clock cycle for maximum computation.

The output conveyor 540 is not shown in FIG. 4, but it is contained within the M×V block 432 and is the means by which the sets of 16 accumulated output results are passed to the bias addition function 434.

IX. EXAMPLE NEURAL NETWORK IMPLEMENTATION

Figure 6:
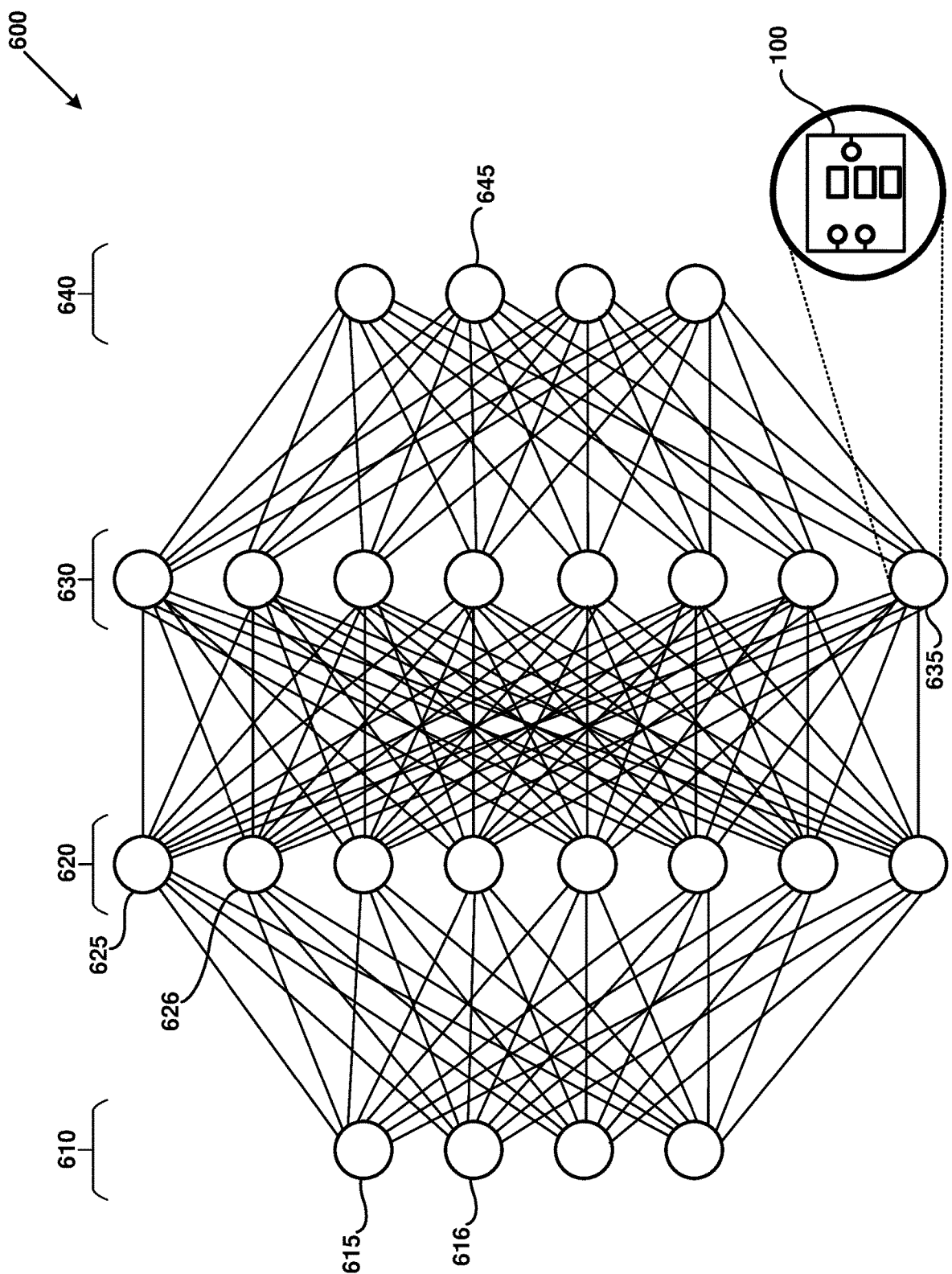
FIG. 6 is a block diagram outlining an example implementation of a deep neural network for image processing, as can be used in certain examples of the disclosed technology.

The BFP implementations discussed above regarding FIGS. 1-5 can be adapted to perform operations with neural networks. For example, FIG. 6 illustrates a simplified topology of deep neural network (DNN) 600 that can be used to perform enhanced image processing using disclosed BFP implementations. One or more processing layers can be implemented using disclosed techniques for BFP matrix/vector operations, including the use of one or more of the plurality 210 of neural network cores in the multiprocessor 200 described above. It should be noted that applications of the BFP implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

As shown in FIG. 6, a first set 610 of nodes (including nodes 615 and 616) form an input layer. Each node of the set 610 is connected to each node in a first hidden layer formed from a second set 620 of nodes (including nodes 625 and 626). A second hidden layer is formed from a third set 630 of nodes, including node 635. An output layer is formed from a fourth set 640 of nodes (including node 645). Each of the nodes produces an output by applying a weight to each input generated from the preceding node and collecting the weights to produce an output value. In some examples, each individual node can have an activation function and/or a bias applied. Each of the nodes can be implemented using an instance of the BFP implementation 100, for example, as shown for the hidden node 635. For example, any appropriately programmed processor or FPGA can be configured to implement the nodes in the depicted neural network 600.

Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification tasks.

As will be readily apparent to one of ordinary skill in the relevant art having the benefit of the present disclosure, BFP matrix multiplication technology disclosed herein, including the selection of common exponents and one or more intermediate and final output stages, can be used to implement some or all layers of the illustrated neural network.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity. As will be readily apparent to one of ordinary skill in the relevant art having the benefit of the present disclosure, BFP matrix multiplication technology disclosed herein, including the selection of common exponents and one or more intermediate and final output stages, can be used to implement some or all layers of the illustrated neural network.

As will be readily understood to one of ordinary skill in the art having the benefit of the present disclosure, the application of BFP implementations can be used for different aspects of using neural networks, whether alone or in combination or subcombination with one another. For example, disclosed BFP implementations can be used to implement neural network training via gradient descent and/or back propagation operations for a neural network. Further, disclosed BFP implementations can be used for evaluation of neural networks.

X. EXAMPLE FIELD PROGRAMMABLE GATE ARRAY ARCHITECTURE

Figure 7:
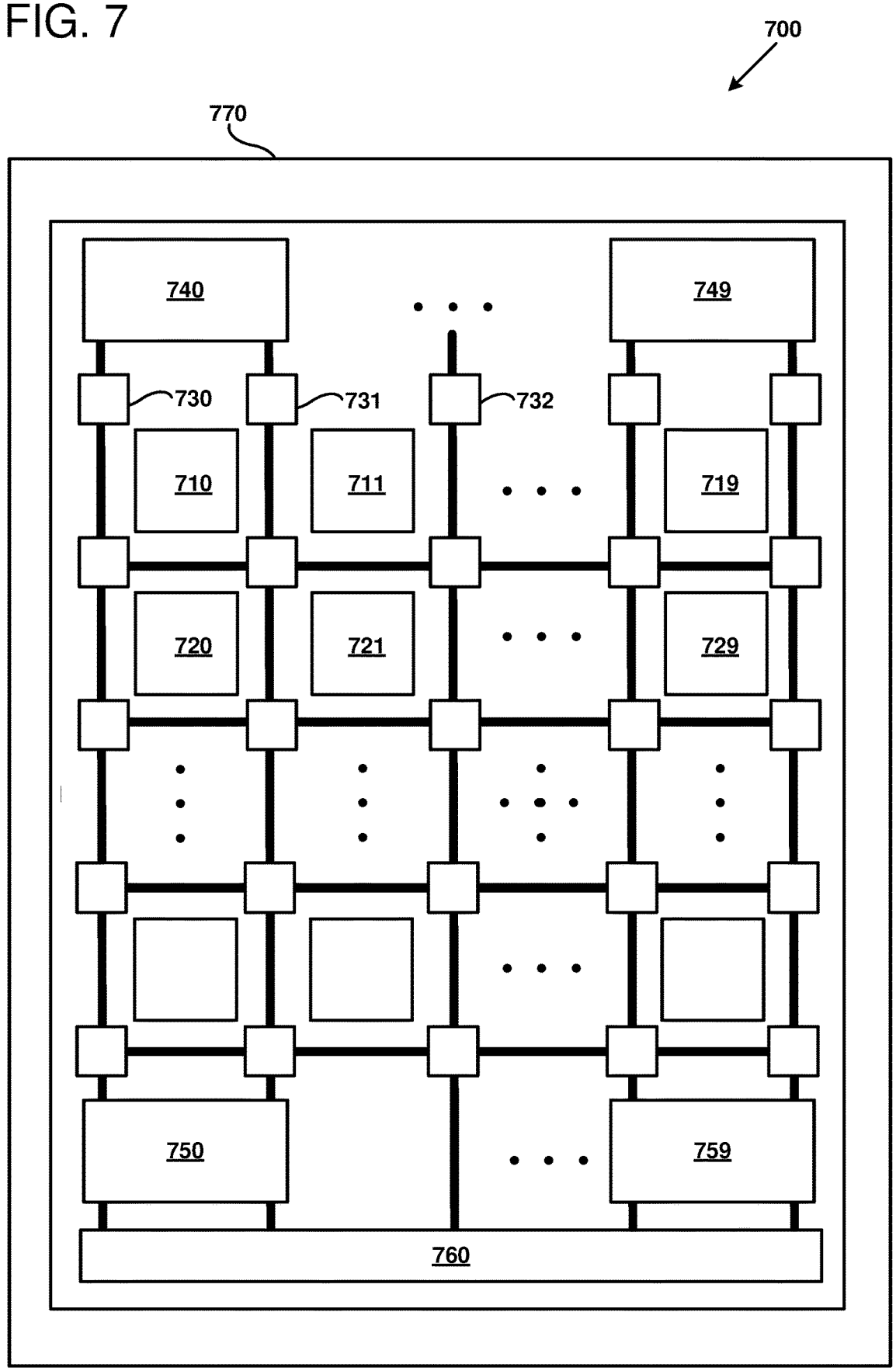
FIG. 7 is a block diagram outlining an example FPGA, as can be used in certain examples of the disclosed technology.

FIG. 7 is a block diagram 700 that depicts an example field programmable gate array (FPGA) architecture that is configured to implement certain examples of the disclosed technology. For example, the multiprocessor 200 discussed above regarding FIG. 2, can be mapped to the FPGA architecture of FIG. 7.

The FPGA includes an array of reconfigurable logic blocks arranged in an array. For example, the FPGA includes a first row of logic blocks, including logic blocks 710, 711, and 719, and a second row of logic blocks including logic blocks 720, 721, and 729. Each of the logic blocks includes logic that can be reconfigured to implement arbitrary logic functions and can also include sequential logic elements such as latches, flip-flops, and memories. The logic blocks are interconnected to each other using a routing fabric that includes a number of interconnect switches that can also be programmable. For example, there is a first row of switch blocks 730, 731, 732, etc., positioned between the first row of reconfigurable logic blocks and the second row of reconfigurable logic blocks. The switches can be configured in order to change wire connections that carry signals between the reconfigurable logic blocks.

The FPGA also includes a number of more complex components. For example, the logic block includes a number of block RAMs, for example, block RAM 740 and block RAM 749. The block RAMs typically contain a larger number of memory bits, for example, a few thousand memory bits that are accessed by applying an address to the memory, and reading from one or more read ports. In some examples, the block RAMs can include two or more write ports and two or more read ports. In other examples, the block RAMs may only have a single read and/or a single write port. While the block RAMs are typically accessed by applying an address and reading corresponding data, in some examples, the block RAMs can be configured with additional circuitry that allows for implementation of more complex functions including shift registers and First-In First-Out (FIFO) buffers.

The illustrated FPGA also includes a number of hard macro blocks including hard macro block 750 and hard macro block 759. These macro blocks can include more complex functionality such as processor functionality, digital signal processing functionality, accelerators, or other functions deemed to be desirable. For example, digital signal processing blocks such as those described above regarding FIG. 5 can be implemented as one or more hard macro blocks of the FPGA. The illustrated FPGA further includes a configuration port 760 that can be used to reprogram logic devices in the FPGA. In some examples, configuration memories that store configuration information for the logic devices can be addressed and read/written to directly. In other examples, a scan chain architecture is used to store configuration information in a serial manner.

The FPGA is further surrounded by an I/O ring 770 that can be coupled to the logic blocks, the block rams, and/or the hard macro blocks in order to receive and send signals to components away from the FPGA. In some examples, the I/O signals are full rail voltage signals, while other examples, differential signals are used. In some examples, the I/O ports can be multiplexed (e.g. time-multiplexed) in order to support input and output of more signals than the number of pins available on the FPGA.

While many examples of FPGAs are typically reconfigurable an arbitrary number of times through the use of electrically erasable memories, in other examples, one-time programmable logic elements can be used. For example, the logic blocks and switches can be programmed with the use of fuses, anti-fuses, or with a ROM mask to program a logic function once that is not easily reversible.

In the reconfigurable case, the FPGA typically has a configuration port that receives data according to a file dubbed a bitstream, or a configuration bitstream. The bitstream data is read into the device and used to program and configure the logic blocks, the switches, the block rams, and/or the hard macros. When a new design is desired, the configuration can be erased and a new design configured into the device. In some examples, the FPGA can be partially reconfigured in order to save on programming time. For example, a subset of the logic blocks, the switches, or block rams can be dynamically reconfigured in the field without reprogramming the entire device.

Using the disclosed technologies, higher performance, and/or more efficient structures can be implemented. Further, it should be readily understood that while some examples of the FPGAs are a stand-alone integrated circuit, in other examples, the FPGA may be packaged differently, for example, in a multi-chip module (MCM), or on the same circuit die as a custom or basic system-on-chip (SoC).

Figure 8:
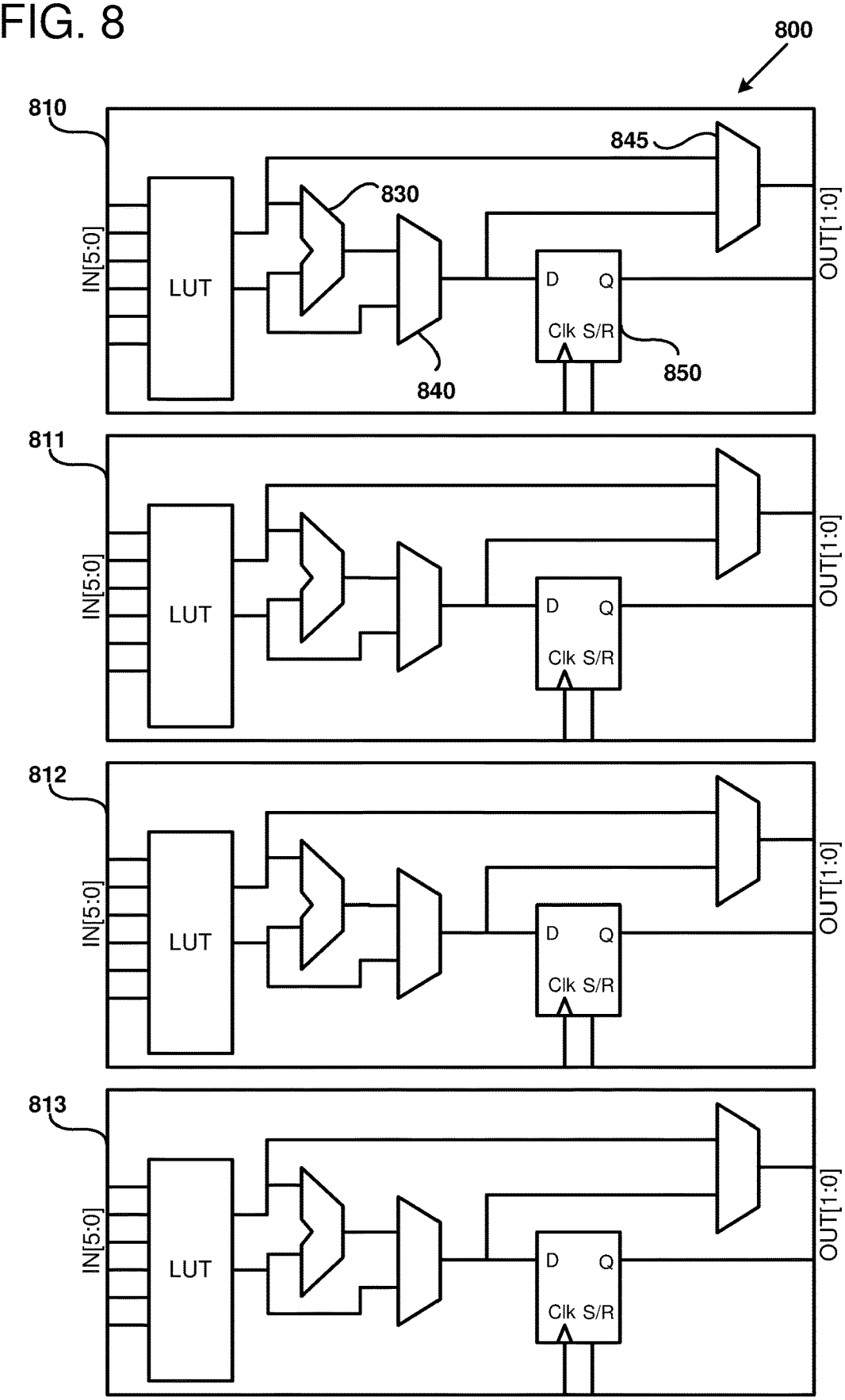
FIG. 8 is a diagram further detailing logic components within an FPGA, as can be used in certain examples of the disclosed technology.

FIG. 8 is a block diagram 800 illustrating four reconfigurable logic blocks 810, 811, 812, and 813 that can be configured to form part of the logic fabric of an example FPGA-integrated circuit. The components inside the reconfigurable logic blocks shown are identical, or homogenous, but it should be readily understood, in other examples, more than one type of reconfigurable logic block may be present on a single FPGA.

A first reconfigurable logic block 810 includes a six-input Look Up Table (LUT) 820 that is coupled to carry logic 830, a number of multiplexers 840 and 845, and a storage element (here, a D flip-flop) 850. The LUT 820 can be implemented using a small memory (for example, a memory having six address bits and two output bits as shown). Thus, any six-input Boolean function can be implemented by using a single LUT. In some examples, outputs of LUTs can be combined, or a reconfigurable logic block can have multiple LUTs that can be connected together in order to perform more complex logic functions. In some examples, common logic functions can be providing in addition to the LUT. For example, the carry logic 830 can be configured to perform the carry propagation logic for an adder. The multiplexers are used to select various output from other components. For example, the multiplexer 840 can be used to select the output of either the LUT 820 or the carry logic 830, while the multiplexer 845 can be used to select another output of the LUT 820 or the multiplexer 840. In some examples, the multiplexer is used to either select a sequential output of a state element (e.g. flip-flop 850), or a combinational output of a Look Up Table. It should be readily understood to one of ordinary skill in the art having the benefit of the present disclosure that different logic functions, LUT sizes, and sequential elements can be employed in a reconfigurable logic element. Thus, techniques for mapping neural networks to such reconfigurable logic can vary depending on the specific target FPGA architecture. The configuration of the logic inside the reconfigurable logic block can be programmed using the configuration port of the FPGA. In some examples, the LUTs are not programmed once, but can be configured to act as small memories that store certain data used in the neural network.

In some examples of the disclosed technology, a logic synthesis tool (logic compiler) is used to transform a specification for BFP functions into a configuration bitstream that can be applied to a configuration port of an FPGA to configure logic to implement the multiprocessor 200 or portions of a neural network. In some examples, the designer can use an RPM (relationally placed macro) methodology to improve area and interconnect delays and achieve a repeatable layout for easy routing and timing closure under module composition and massive replication. For example, by including structural RTL instantiating modules and tiling them into a scheduler, logic for the instruction scheduler can be locked to a set of single LUTs, allow for a compact clustering and placement of logic within the FPGA.

XI. EXAMPLE MAPPINGS TO COMMERCIAL FPGAS

Figure 9:
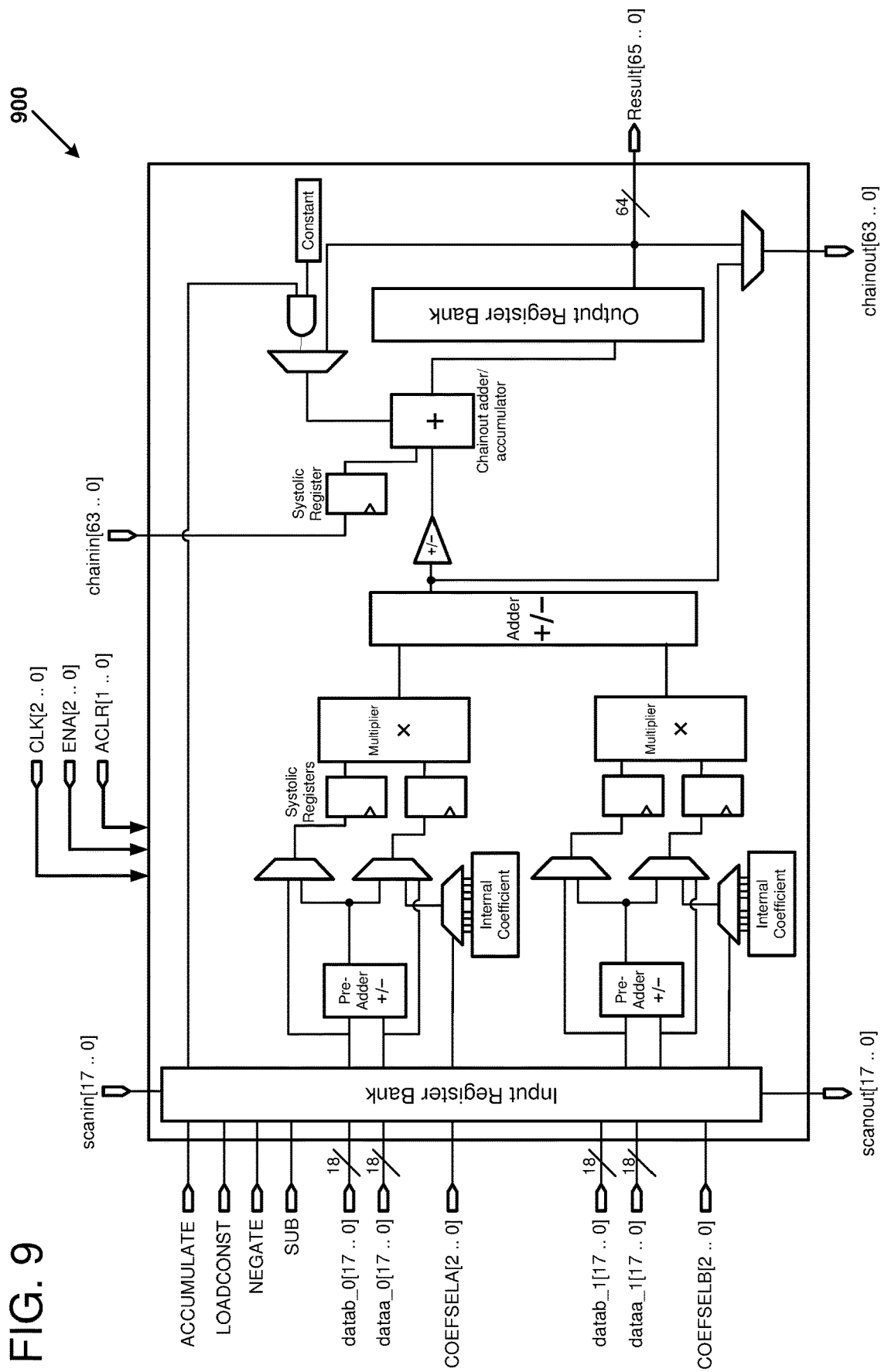
FIG. 9 is a schematic illustrating an implementation of a signal processor implemented with an Altera FPGA, as can be implemented in certain examples of the disclosed technology.

FIG. 9 is a block schematic 900 from the Altera Corporation data sheet for the Stratix V FPGA illustrating a DSP block and its data paths from FIG. 5. The input registers (510, 515, 520 and 525) are shown on the left hand side, the multipliers and summation operation are in the center and the accumulator register 530 is shown on the right.

Figure 10:
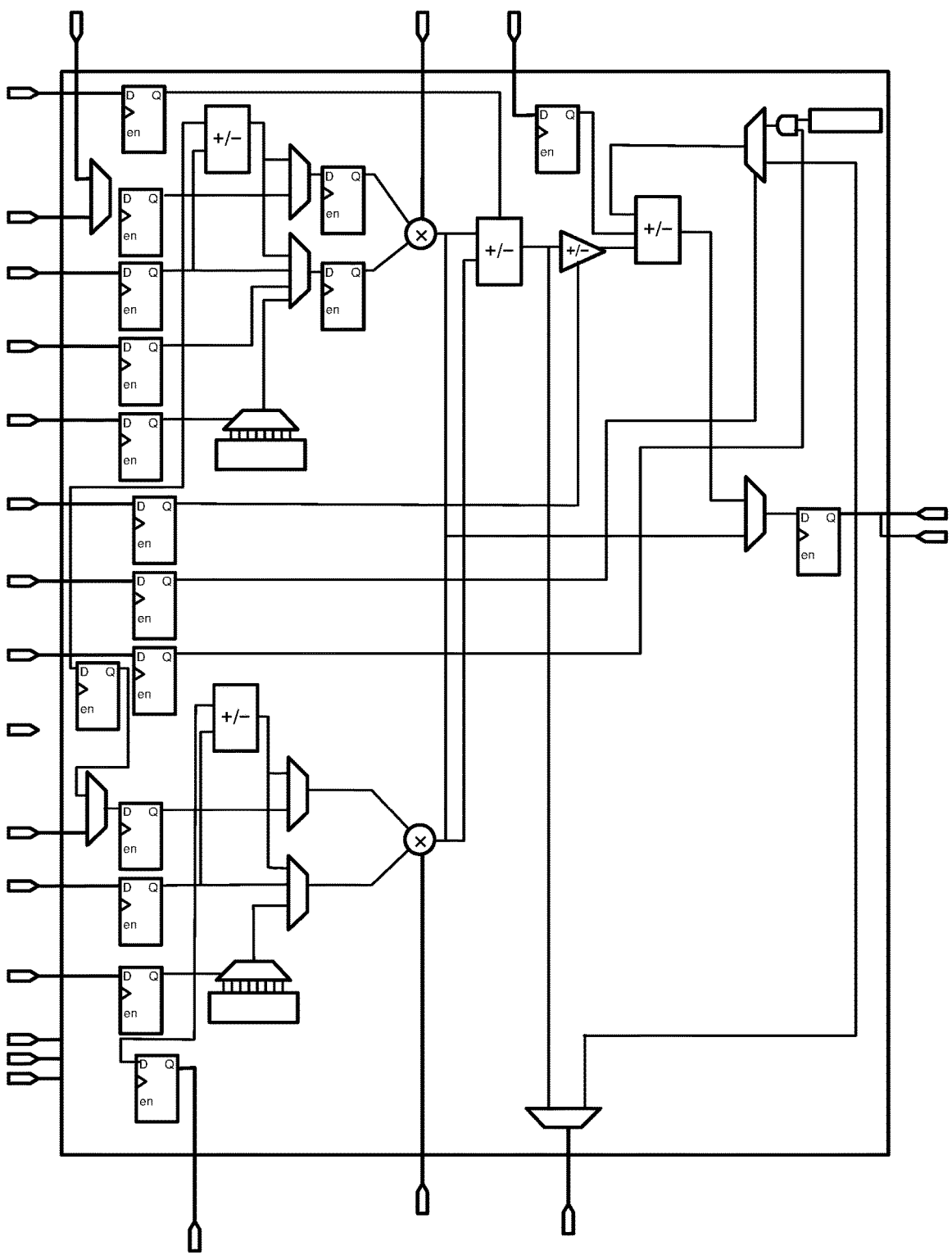
FIG. 10 is a schematic illustrating an example implementation of a signal processor implemented with an Altera FPGA, as can be implemented in certain examples of the disclosed technology.

FIG. 10 is an example block schematic 1000 further detailing utilization of resources of the same DSP as is implemented in an example FPGA manufactured by Altera Corporation. The input registers (510, 515, 520 and 525) are shown on the left, but the data paths that would pass the weights from left to right and the inputs from top to bottom are not shown. Due to implementation details of the Altera Stratix V FPGA, it is not possible to include these regions in the DSP and they have been implemented using logic outside of the DSP.

XII. EXAMPLE METHOD of OPERATIONS WITH MATRICES THAT SHARE A COMMON EXPONENT

Figure 11:
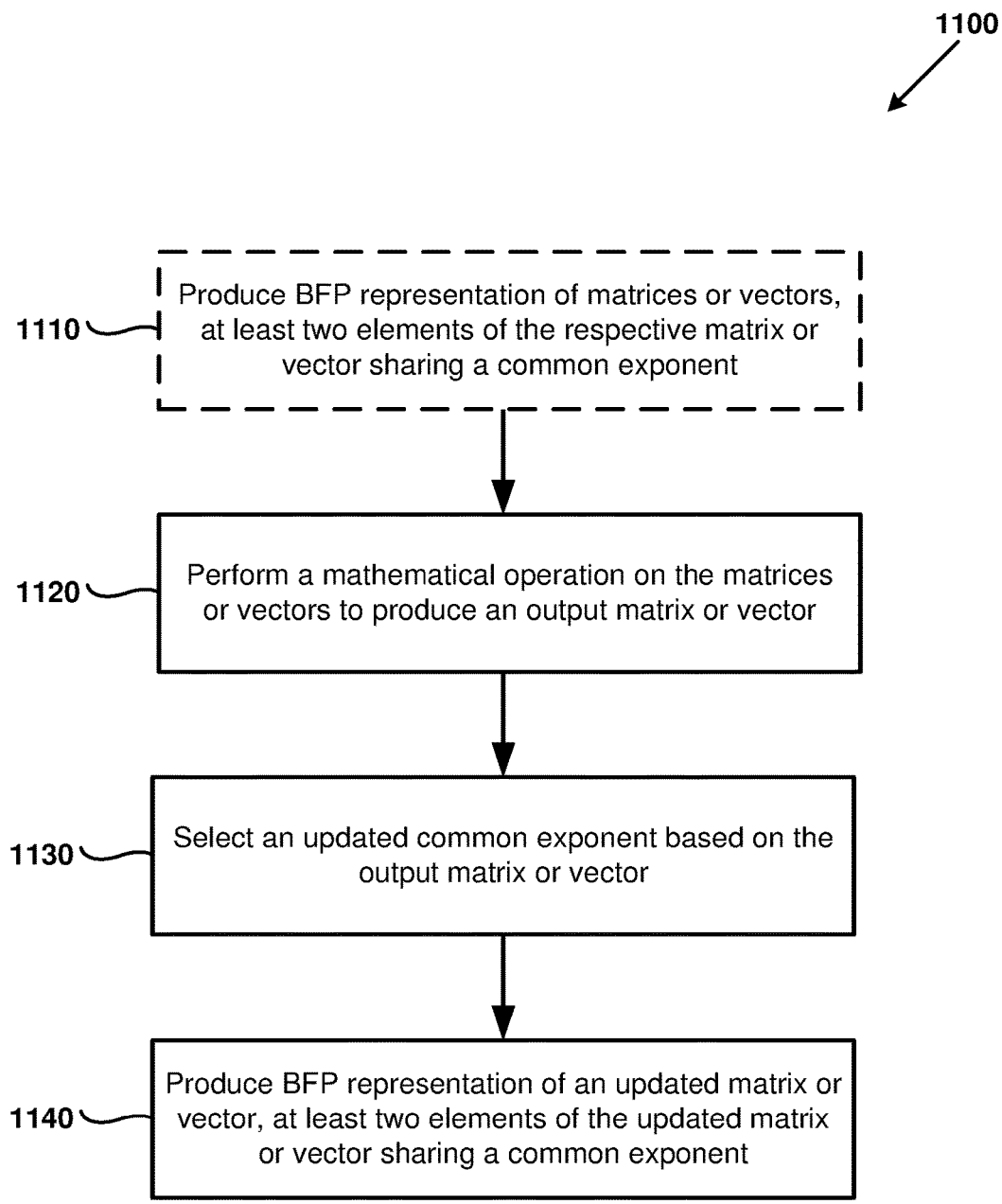
FIG. 11 is a flowchart outlining an example method of performing mathematical operations using one or more shared common exponents, as can be performed in certain examples of the disclosed technology.

FIG. 11 is a flowchart 1100 outlining an example method of performing mathematical operations with matrices and/or vectors whose elements share a common exponent between two or more values of their respective matrix or vector. Mantissa values are stored in each of the matrices or vectors.

At process block 1110, a block floating-point (BFP) representation is produced of matrices or vectors, where at least two elements of the respective matrix or vector share a common exponent. For example, one or more of the matrices or arrays can include 16-bit mantissa values and reference a common exponent. Producing the BFP representation can include shifting of the mantissas in order to comply with a selected common exponent. In some examples, each of the plurality of matrices or vectors includes an array of signed or unsigned mantissas. In some examples, the shared common exponent is stored at a single location in memory. In some examples, the common exponent applies to all of the values stored in a respective matrix or vector. In other examples, a common exponent can be applied for a set of a number of rows of a respective matrix or vector. For example, each row can have its own associated common exponent. In some examples, a portion of a matrix is associated with the common exponent. For example, a matrix could be divided into quarters and each portion of the matrix, for example, upper left, upper right, lower left, lower right, can be associated with a different common exponent. As will be readily understood to one of ordinary skill in the art having the benefit of the present disclosure, in some examples, some elements of a matrix of vector share a common exponent, while other elements of a matrix or vector may share a different common exponent, and while still other elements may be associated with a unique exponent. In some examples, some elements of the matrix or vector may be expressed in a different form of representation, for example, as a fixed point number, an integer number, a symbol, or other form.

At process block 1120, a mathematical operation is performed on the matrices and/or vectors to produce an output matrix or a vector. For example, a matrix can be multiplied by a matrix, a matrix can be multiplied by a vector, a vector can be multiplied by a vector, or a vector can be multiplied by a matrix. Other suitable operations, including sigmoid functions, hyperbolic tangents, matrix inversion, division, addition, subtraction, or other suitable matrix operation can be performed as at least a portion of the mathematical operation. In some examples, performing the mathematical operation includes multiplying mantissas stored in a first matrix or vector of the plurality of matrices or vectors by mantissas stored in a second matrix or vector of a plurality of matrices or vectors. Some examples, of performing the mathematical operation includes adding a first common exponent for a first matrix or vector of the plurality of matrices or vectors to a second common exponent for a second matrix or vector of the plurality of matrices or vectors. In some examples, performing the mathematical operation includes performing a systolic array matrix multiplication for mantissas in a first matrix or vector by mantissas stored in a second matrix or vector.

At process block 1130, one or more updated exponent(s) for all or a portion of the output matrix or vector produced at process block 1120 are selected. In some examples, the one or more exponents are selected based on the maximum absolute value across each subset of the elements in the output matrix or vector. In some examples, the updated common exponent(s) are selected by determining a mean and standard deviation for absolute values of the output matrix or vector. In some examples, at least one of the exponents is selected based on a confidence interval for values across each respective subset of the matrix or vector. In some examples, the selecting is based on a breadth of dynamic range and/or an assessed error value introduced by a prospective selected updated common exponent for a respective portion of the output matrix or vector. For example, a tradeoff can be made between the breadth of dynamic range of representative values and the output matrix versus error introduced for the selected updated common exponent(s) for the output matrix. In some examples, the common exponent(s) are selected by checking for overflow conditions and adjusting the updated common exponent(s) to avoid or minimize such overflow or underflow conditions. In some examples, the updated common exponent(s) are determined by using a predefined number of previous element values of the output matrix or vector. Thus, the common exponent(s) can be based on a rolling set of values as computations are performed to generate the output matrix or vector. In some examples, selecting the common exponent(s) includes computing a mean, standard deviation, and/or variance for a portion of element values computed for the output matrix or vector. For example, a rolling number of output values can be used for computing a rolling mean, standard deviation, or variance.

At process block 1140, a BFP representation is produced for an updated matrix or vector where at least two elements of the updated matrix or vector share a common exponent. In some examples, after producing the updated matrix or vector, additional mathematical operations can be performed and/or common exponents can be updated for each successive iteration of the mathematical operation. As will be readily understood to one of ordinary skill in the art having the benefit of the present disclosure, in some examples, some elements of a matrix of vector share a common exponent, while other elements of a matrix or vector may share a different common exponent, and while still other elements may be associated with a unique exponent. In some examples, some elements of the matrix or vector may be expressed in a different form of representation, for example, as a fixed point number, an integer number, a symbol, or other form.

In some examples, the method outlined in FIG. 11 can be used to update associated values for nodes within a neural network. As node values or weights in the neural network do not necessarily need to be 100 percent accurate, rounding or other errors caused by using a shared common exponent may be acceptable for particular neural network applications. For example, the method outlined in FIG. 11 can be used to update a layer of node values within a neural network, including convolutional neural networks. For subsequent operations, an implementation can repeat the operations described above at process blocks 1120, 1130, and/or 1140 to perform additional operations using the BFP representation. For example, the memory storing the BFP representation can be reused for subsequent operations. The BFP representation product at process block 1140 can be converted to another representation for use by other applications. For example, the produced BFP representation can be converted to matrices/vectors expressed in floating-point or fixed point formats. Further, in some examples the resultant and other matrices/vectors may remain in a BFP representation to be used as inputs to subsequent stages in the neural network evaluation, without conversion to another representation.

XIII. EXAMPLE METHOD OF CONFIGURING LOGIC DEVICES WITH CUSTOM FUNCTION BLOCKS

Figure 12:
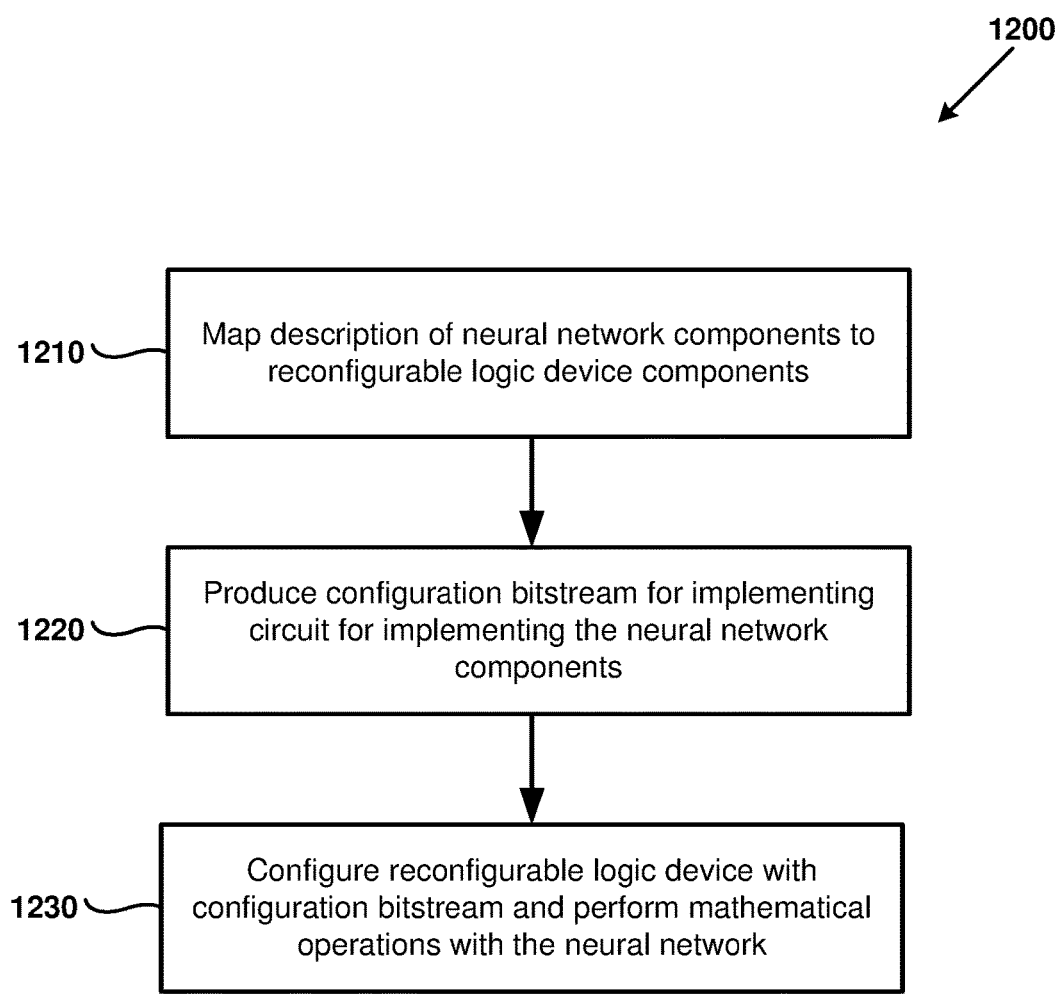
FIG. 12 is a flowchart outlining an example of configuring a reconfigurable logic device to perform mathematical operations with a neural network, as can be performed in certain examples of the disclosed technology.

FIG. 12 is a flow chart 1200 outlining an example method of configuring a reconfigurable logic device, as can be performed in certain examples of the disclosed technology. For example, the FPGA discussed above regarding FIGS. 8 and 9 can be configured to implement all or a portion of the multiprocessor 200 of FIG. 2, including some or all of the neural network cores.

At process block 1210, a description of multiprocessor components is mapped to reconfigure logic device components of the FPGA. For example, a process designer can specify a description of the multiprocessor in the hardware description language, such as SystemVerilog, SystemC, VHDL, Verilog, or any other suitable combination of hardware description languages. In some examples, a description written in a traditional programming language such as C, C++, or OpenCL are used to describe at least a portion of the multiprocessor. The description of the multiprocessor can include any of the components discussed above. In some examples, the designer can specify specific FPGA cells to be targeted by elements of the neural network hardware. For example, the designer may specify that systolic matrix operations be mapped to DSP resources of the FPGA. In some examples, the programmer can use available macros provided by the FPGA vendor to implement custom function units, FIFO buffers, shift registers, and other components using economical mappings for that FPGA. In some examples, widths of mantissas or exponents are selected based on widths of corresponding FPGA structures. This can improve efficiency of certain FPGA implementations (e.g., by selecting 16- or 32-bit wide formats corresponding to 16- or 32-bit wide structures of the FPGA.

At process block 1220, a configuration bitstream is produced for implementing a circuit for the multiprocessor 200 that includes neural network nodes and layers. For example, a description of a multiprocessor expressed in a hardware description language can be compiled to generate a netlist, and the netlist in turn used to generate a bitstream file. The signals indicated in the bitstream file can be applied to the configuration interface of an FPGA in order to configure the FPGA to perform functions for implementing a multiprocessor according to the disclosed techniques.

At process block 1230, the reconfigurable logic device is configured using the bitstream generated at process block 1220. For example, some FPGAs have a configuration port that is used to stream data into configuration memory of the FPGA, thereby configuring the FPGA. In some examples, configuration memory of the FPGA is addressed through a parallel or other addressable port. In some examples, a configurable logic device having a structure similar to an FPGA can be configured once, but not reconfigured. In other examples, the FPGA can be electrically erased and rewritten to in order to provide a new configuration. In some examples, the FPGA is re-configured whenever the integrated circuit is re-powered, while in other examples, the FGPA configuration maintains state across repeated power cycles.

XIV. EXAMPLE COMPUTING ENVIRONMENT

Figure 13:
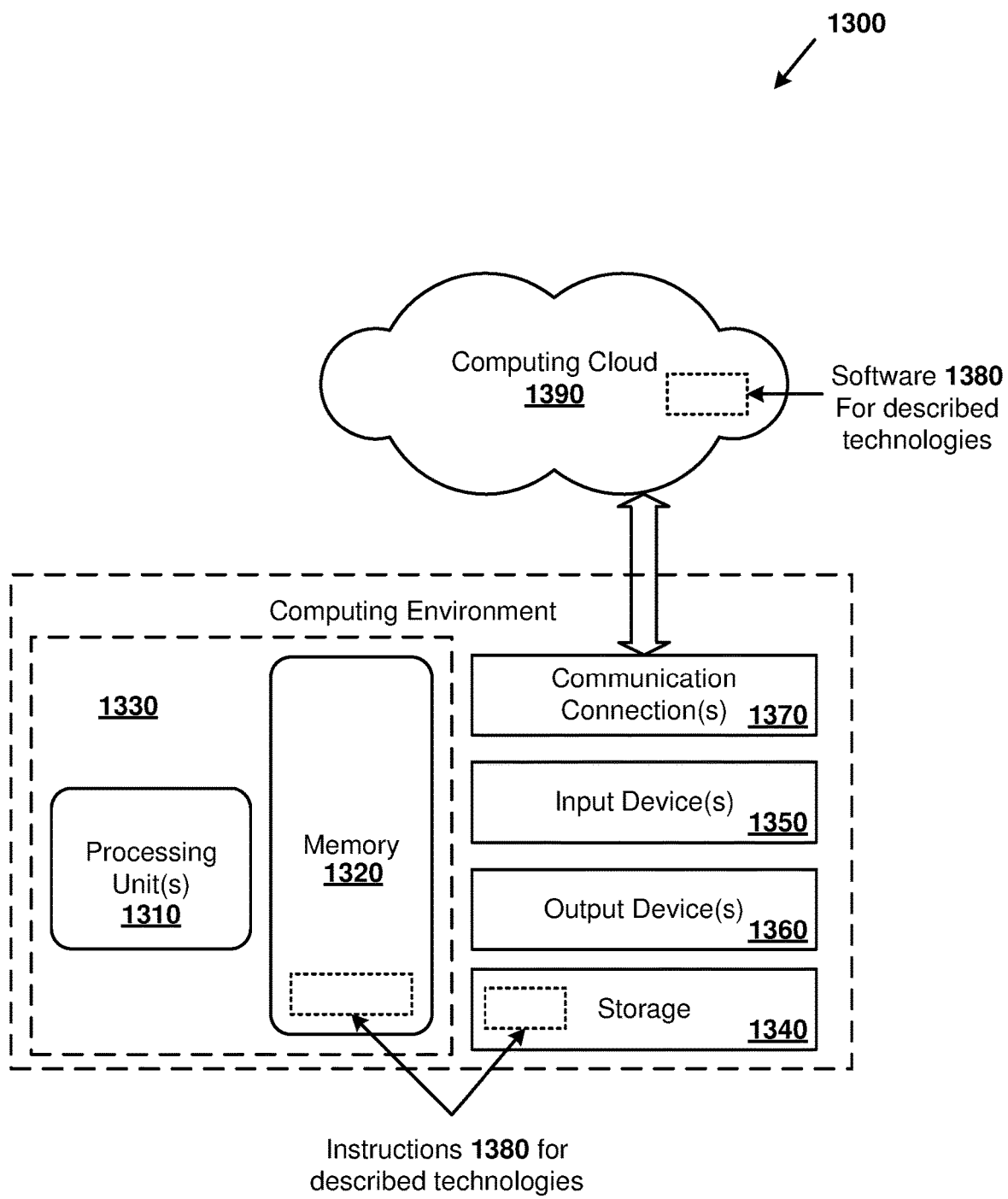
FIG. 13 is a diagram illustrating an example computing environment in which certain implementations of the disclosed technologies can be implemented.

FIG. 13 illustrates a generalized example of a suitable computing environment 1300 in which described embodiments, techniques, and technologies, including configuring a multiprocessor, can be implemented. For example, the computing environment 1300 can implement disclosed techniques for configuring a processor to implement disclosed multiprocessor architectures and neural networks, and/or compile code into computer-executable instructions and/or configuration bitstreams for performing such operations including neural networks, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input device(s) 1350, one or more output device(s) 1360, and one or more communication connection(s) 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers, processors, and/or neural networks are implemented with servers located in the computing environment, or the disclosed compilers, processors, and/or neural networks can be implemented on servers located in the computing cloud 1390. In some examples, the disclosed compilers execute on traditional central processing units (e.g., RISC or CISC processors), central processing units extended to include vector processing instructions, or vector processors.

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XV. ADDITIONAL EXAMPLES OF THE DISCLOSED TECHNOLOGY

As will be readily apparent to one of ordinary skill in the art having the benefit of the present disclosure, disclosed methods, apparatus, and computer-readable storage media can be combined in various combinations and subcombinations with each other, depending on a desired application or function to be performed. For example, in some examples of the disclosed technology, a method includes producing a block floating-point (BFP) representation of a plurality of matrices or vectors where at least two elements of the respective matrices or vectors sharing a common exponent, performing a mathematical operation on two or more of the plurality of matrices or vectors, producing an output matrix or vector, based on the output matrix or vector, selecting an updated common exponent for at least two or more elements of the output matrix or vector, and producing a BFP representation of an updated matrix or vector, at least two elements of the updated matrix or vector sharing a common exponent. In some examples of the method, the mathematical operation is performed on two matrices. In some examples, the mathematical operation is performed on a matrix and a vector. In some examples, the mathematical operation is performed on two vectors. In some examples, the mathematical operation is one of matrix multiplication, division, addition, or subtraction. In some examples, the mathematical operation includes the addition or subtraction of a scalar vector (e.g., a bias vector). In some examples, the mathematical operation includes other matrix operations, such as inversion, decomposition, transposition, or calculation of a determinant.

In some examples of the disclosed technology, matrix or vector operations performed with a BFP implementation include performing matrix multiplication by multiplying mantissa elements for two matrices (or matrix and vector, or vector and vector) and adjusting the output common exponents for the two matrices to produce an output multiplied matrix (or vector). For example, the two common exponents can be added. In other examples, a different manner of selecting the common exponent is employed (e.g., by selecting an exponent to reduce error in the output BFP representation). Some examples include performing matrix division by dividing each of a number of mantissa elements for two matrices and adjusting the respective common exponents, producing an output divided matrix. For example, one common exponent can be subtracted from another. In other examples, a different manner of selecting the common output exponent is employed (e.g., by selecting an exponent to reduce error in the output BFP representation). Some examples include shifting mantissas of one matrix and adding the shifted mantissas to mantissa elements of a second matrix. An updated common exponent is selected to represent the resulting output matrix (e.g., by increasing the exponent accordingly). In some examples, one matrix is subtracted from a second matrix by shifting mantissas of one of the matrices and subtracting the mantissa elements, then selecting an updated common exponent to represent the resulting output matrix (e.g., by decreasing the exponent accordingly). In some examples, a different common exponent in the result can be selected to improve precision of the result matrix.

In some examples of the disclosed technology, the plurality of matrices or vectors comprises an array of signed or unsigned mantissas. In some examples, the shared common exponent is stored at a single location in memory. In some examples, the common exponent applies to all of the values stored in a respective matrix or vector. In other examples, a common exponent can be applied for a set of a number of rows of a respective matrix or vector. For example, each row can have its own associated common exponent. In some examples, a portion of a matrix is associated with the common exponent. For example, a matrix could be divided into quarters and each portion of the matrix, for example, upper left, upper right, lower left, lower right, can be associated with a different common exponent. Values for the matrices and the shared exponents can be stored in any suitable memory storage device. For example, for the matrices and the shared exponents can be stored in an addressable memory (e.g., dynamic random access memory (DRAM, including DDR, DDR2, etc., DRAM), embedded DRAM (eDRAM), or static random access memory (SRAM), an array of latches, an array of flip-flops, a register file, a block random access memory (block RAM) (sometimes called "memory blocks"), a First-In First Out (FIFO) buffer, or a shift register. In some examples, values for the matrices are stored in an addressable memory or register file and values for the shared exponents are stored in a number of flip-flops or latches. In some examples, storage such as flip-flops or registers are allocated to store values for shared exponents statically (e.g., one register stores all the exponent values at a particular stage of BFP processing, or one register is allocated per column/row of the matrix). In some examples, storage is allocated to store the exponents dynamically. In some examples, exponent values can be accessed by performing a table lookup (e.g., by using a row, column pair of a matrix as an index to identify a shared exponent storage location).

In some examples of the disclosed technology, a method of performing the mathematical operation further includes adding a first common exponent for a first matrix or vector of the plurality of matrices or vectors to a second common exponent for a second matrix or vector of the plurality of matrices or vectors. In some examples, the performing the mathematical operation further includes performing a systolic array matrix multiplication for mantissas stored in a first matrix or vector of the plurality of matrices or vectors by mantissas stored in a second matrix or vector of the plurality of matrices or vectors. In some examples, the performing the mathematical operation further includes adding or subtracting a bias vector to a product of the plurality of matrices or vectors. In some examples, the performing the mathematical operation further includes performing an additional function to a product of the plurality of matrices or vectors. The additional function can be a linear function, a non-linear function, an activation function, a transfer function, or another function selected for a particular application. In examples of the method for neural network processing, a sigmoid, hyperbolic tangent (tan h), or other similar function are frequently applied to the vector result.

In some examples of the disclosed technology, selecting an updated common exponent includes computing a mean, standard deviation, and/or variance for a portion but not all output element values computed for the output matrix or vector. In examples, selecting an updated common exponent includes assessing error introduced by the selected updated common exponent for the output matrix vector. In some examples of the disclosed technology, a single common exponent is selected for all values in a matrix or vector in a BFP representation. In some examples, a common exponent is used for some but not all values in a respective matrix or vector of the plurality of matrices or vectors. In some examples, all elements in a row, in a column, or an entire array can have varying mantissas and share a common exponent. In some examples, designated combinations and sub combinations of two or more elements of a matrix or vector can share a common exponent. In some examples, an arbitrary combination of two or more elements of a matrix or vector can share a common exponent. In some examples, storage such as flip-flops or registers are allocated to store values for shared exponents statically (e.g., one register stores all the exponent values at a particular stage of BFP processing, or one register is allocated per column/row of the matrix). In some examples, storage is allocated to store the exponents dynamically. In some examples, exponent values can be accessed by performing a table lookup (e.g., by using a row, column pair of a matrix as an index to identify a shared exponent storage location).

In some examples, the mathematical operation performed includes performing matrix multiplication and adding a first common exponent for a first matrix or vector of the plurality of matrices or vectors to a second common exponent for a second matrix or vector of the plurality of matrices or vectors. In some examples, mathematical operation includes performing matrix division and subtracting a first common exponent for a first matrix or vector of the plurality of matrices or vectors from a second common exponent for a second matrix or vector of the plurality of matrices or vectors. In some examples, mathematical operation includes performing matrix addition or subtraction and shifting a mantissa of at least one matrix or vector of the plurality of matrices or vectors. In some examples, a bias vector is added to the result of the mathematical operation. In some examples, an activation function is applied to the result of the mathematical operation. In some examples, a bias vector is added to the result and an activation function is applied to the result with the added bias vector.

In some examples of the disclosed technology, the method further includes updating node values for a neural network with element values produced by the performing the mathematical operation. In some examples, the neural network is a DNN, CNN, LSTM, or GRU. In some examples, the neural network is implemented using a general purpose processor, including general-purpose processor adapted to use vector or SIMD instructions such as SSE, SSE2, or AVX x86_64 instructions. The neural network hardware used for the disclosed methods can also include vector processors, custom integrated circuits, application-specific integrated circuits (ASICs), field programmable gate arrays (FPGAs), graphics processing units (GPUs), neural networking processors, and/or digital signal processing components.

In some examples, the method further includes repeating the acts of performing the mathematical operation, selecting the updated common exponent, and producing the BFP representation of the updated matrix or vector with the updated common exponent.

In some examples of the method, the mathematical operation is performed using means for matrix multiplication. In some examples, the mathematical operation is performed by selecting the updated common exponent is performed using means for common exponent updating. In some examples, the mathematical operation is performed by producing the BFP representation of the updated matrix or vector is performed using means for producing a BFP representation of a matrix or vector. In some examples, any two or all three of the aforementioned techniques for performing the mathematical operation are employed.

In some examples, the method includes programming a reconfigurable logic device and/or a digital signal processing component to perform one or more of the recited method acts. For example, configuration memory can be used to program an FPGA prior to initiating performance of the recited method acts.

In some examples of the disclosed technology, a method includes performing a mathematical operation on two or more of a plurality of matrices or vectors, producing an block-floating point representation (BFP) output matrix or vector, at least two mantissas of the respective matrices or vectors sharing a common exponent, and selecting an updated common exponent for two or more values of the output matrix or vector. In some examples of the method, the mathematical operation is performed on two matrices. In some examples, the mathematical operation is performed on a matrix and a vector. In some examples, the mathematical operation is performed on two vectors. In some examples, the mathematical operation is one of matrix multiplication, division, addition, or subtraction. In some examples, the mathematical operation includes the addition or subtraction of a scalar vector (e.g., a bias vector). In some examples, the mathematical operation includes other matrix operations, such as inversion, decomposition, transposition, or calculation of a determinant.

In some examples of the method, the plurality of matrices or vectors comprises an array of signed or unsigned mantissas. In some examples, the shared common exponent is stored at a single location in memory. In some examples, the common exponent applies to all of the values stored in a respective matrix or vector. In other examples, a common exponent can be applied for a set of a number of rows of a respective matrix or vector. For example, each row can have its own associated common exponent. In some examples, a portion of a matrix is associated with the common exponent.

In some examples of the method, selecting the updated common exponent comprise determining a mean, a standard deviation, or a mean and a standard deviation for absolute values of the output matrix or vector. In some examples, the method includes selecting the exponent based on a confidence interval for values of the output matrix or vector. In some examples, the selecting the updated common exponent is based on a predefined number of previous output element values computed for the output matrix or vector. For the example, the predefined number can be any suitable number of values, including: 1, 2, 4, 8, 16, 32, 48, 64, 128, 256, 512, 1,024, or 8,192. In some examples, the previous output element values are not calculated dynamically, but are assigned statically prior to performing an operation on a BFP representation. In some examples of the method, a common exponent is applied for some but not all values in a respective matrix or vector of the plurality of matrices or vectors. In some examples, a single common exponent is used. In some examples, a common exponent is assigned for each row or column of a matrix. In some examples, selecting the updated common exponent includes assessing error introduced by the selected updated common exponent for the output matrix vector. For example, an error magnitude can be calculated and compared to a predetermined value to determine whether to adjust the selected common exponent.

In some examples of the disclosed technology, a system for performing matrix and/or vector operations using a BFP representation includes a general-purpose processing unit and memory configured to control operation of a neural network; and In some examples of the disclosed technology, the system is configured to update node values for a neural network with element values produced by the performing the mathematical operation. In some examples, the neural network is a DNN, CNN, LSTM, or GRU. In some examples, the neural network is implemented using a general purpose processor, including general-purpose processor adapted to use vector or SIMD instructions such as SSE, SSE2, or AVX x86_64 instructions. The neural network hardware used for the disclosed methods can also include vector processors, custom integrated circuits, application-specific integrated circuits (ASICs), field programmable gate arrays (FPGAs), graphics processing units (GPUs), neural networking processors, and/or digital signal processing components. In examples of other applications that do not use neural networks, similar hardware can be employed to operate on BFP representations, including the aforementioned general-purpose or specialized processors, ASICs, SoCs, FPGAs, GPUs, and/or DSPs.

In some examples of the system, values for the matrices and the shared exponents can be stored in any suitable memory storage device. For example, for the matrices and the shared exponents can be stored in an addressable memory (e.g., dynamic random access memory (DRAM), including DDR, DDR2, etc., DRAM), embedded DRAM (eDRAM), or static random access memory (SRAM), an array of latches, an array of flip-flops, a register file, a block random access memory (block RAM) (sometimes called "memory blocks"), a First-In First Out (FIFO) buffer, or a shift register. In some examples, values for the matrices are stored in an addressable memory or register file and values for the shared exponents are stored in a number of flip-flops or latches. In some examples, storage such as flip-flops or registers are allocated to store values for shared exponents statically (e.g., one register stores all the exponent values at a particular stage of BFP processing, or one register is allocated per column/row of the matrix). In some examples, storage is allocated to store the exponents dynamically. In some examples, exponent values can be accessed by performing a table lookup (e.g., by using a row, column pair of a matrix as an index to identify a shared exponent storage location).

In some examples, the system is further configured to perform operations, including performing a mathematical operation on two or more of a plurality of matrices or vectors, producing an output matrix or vector, based on the output matrix or vector, selecting an updated common exponent, and producing a BFP representation of an updated matrix or vector, at least two elements of the updated matrix or vector sharing a common exponent. In some examples, the system is configured to assign one of a plurality of common exponents to a respective mantissa for each element in a matrix or vector.

In some examples, the operations are performed with reconfigurable logic devices (including, e.g., FPGAs). The operations performed with the reconfigurable logic devices can include storing mantissas and/or exponents for a series of the output matrix or vector in a memory, where the selecting the updated common exponents is based on the mantissas and/or exponents stored in the memory. The memory used to store matrices and/or vectors can include any one or more of the following: an addressable memory, a register file, a block random access memory (RAM), a FIFO buffer, or a shift register. In some examples, the system further performs adding a first common exponent for a first matrix or vector of the plurality of matrices or vectors to a second common exponent for a second matrix or vector of the plurality of matrices or vectors.

In some examples, the mathematical operation is one of matrix multiplication, division, addition, or subtraction. In some examples, the mathematical operation includes the addition or subtraction of a scalar vector (e.g., a bias vector). In some examples, the mathematical operation includes other matrix operations, such as inversion, decomposition, transposition, or calculation of a determinant In some examples, the operation includes multiple operations.

In some examples of the disclosed technology, the system includes a multiprocessor with a number of neural processing cores. In some examples, the system includes a sequencer. In some examples, the system includes sequencer coupled to a single functional column (e.g., a multiplier column) In other examples, two or more functional columns (e.g., two or more multiplier columns) are coupled to the sequencer and used to perform BFP representation operations, including systolic array multiplication. In some examples, the functional column includes input buffers configured to receive operands from a matrix or vector stored in memory. In some examples, the multiplier column includes a multiplier and an adder. In other examples, other functional units are provided instead of or in addition to a multiplier and adder, including subtractors, dividers, adders, or shifters. In some example, the multiplier column includes one or more arithmetic and logic units (ALUs) configured to perform a selected operation on the input elements. In some examples, a functional unit is provided to apply an activation, transfer, or other function to the output of the previous functional unit in the column. In examples where two or more functional columns are used, a relay can be used to send operands from a first column to a second column, or to send operands to and from coupled columns. In some examples, the functional column includes an output buffer for outputting operands of the column to, for example, the sequencer.

In some examples of the disclosed technology, one or more computer readable storage devices or memory storing computer-readable instructions that when executed by a computer, cause the computer to perform at least any one of the disclosed methods. In some examples, a system is configured to perform at least any one of the disclosed methods. In some examples, a system is coupled to computer readable storage devices or memory storing computer-readable instructions that when executed, cause the system to perform at least any one of the disclosed methods.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

We claim:

1. A method comprising:
   with an apparatus comprising memory in communication with a reconfigurable logic device, a processor, or a neural network component configured to implement a neural network:
   by the apparatus, in response to initiating execution of a single instruction multiple data (SIMD) or vector instruction:
   with an integer array multiplier, performing a mathematical operation on a plurality of matrices or vectors stored as a block floating-point (BFP) representation comprising a respective mantissa for each element of the plurality of matrices or vectors and a respective common exponent shared by at least two of the elements of the plurality of matrices or vectors;
   storing the result of the performing the mathematical operation as an output matrix or vector in the memory;
   producing a result exponent with an adder circuit that receives at least two of the respective common exponents of the plurality of matrices or vectors, and storing the result exponent in the memory;
   updating the respective common exponent for at least two or more elements of the output matrix or vector based on the result exponent and on a mean and a standard deviation of a set of absolute values comprising values in the output matrix or vector, thereby producing an updated common exponent; and
   storing a BFP representation of an updated matrix or vector in the memory, at least two elements of the updated matrix or vector sharing the updated common exponent.

2. The method of claim 1, wherein the updating the common exponent comprises sampling a predetermined number of elements of the output matrix or vector.

3. The method of claim 1, further comprising determining the mean by maintaining a running sum of values that are to share a common exponent and dividing by the number of values.

4. The method of claim 1, further comprising determining the standard deviation by calculating values in a running fashion.

5. The method of claim 1, further comprising storing the set of absolute values in a first-in first-out (FIFO) buffer or a shift register.

6. The method of claim 1, wherein the updated common exponent is determined to preserve a maximum value of the output matrix or vector.

7. The method of claim 6, wherein the updated common exponent is determined by computing loge of the maximum value.

8. The method of claim 7, wherein the updated common exponent is further determined by computing an integer floor function or an integer ceiling function with the loge computation of the maximum value.

9. The method of claim 1, further comprising determining some of the set of absolute values by:
   performing a mathematical operation on a plurality of matrices or vectors stored as a block floating-point (BFP) representation comprising a common exponent shared by at least two elements of the plurality of matrices or vectors, thereby producing an output matrix or vector.

10. The method of claim 1, wherein the common exponent is shared by all elements of at least one of the plurality of matrices or vectors.

11. One or more computer-readable storage media storing computer-readable instructions, which when executed by a processor, cause the processor to perform the method of claim 1.

12. The computer-readable storage device of claim 1, wherein the respective mantissas for the matrices or vectors are stored in a block RAM or a memory block of the reconfigurable logic device.

13. The computer-readable storage device of claim 12, wherein the respective common exponents are stored in LUTS, flip-flops, or registers but not stored in a block RAM or a memory block.

14. The computer-readable storage device of claim 1, wherein the respective mantissas for the matrices or vectors are stored in a block RAM or a memory block and the respective common exponents are not stored in a block RAM or a memory block.

15. The computer-readable storage device of claim 1, further comprising, instructions to, prior to the performing the mathematical operation, select the common respective exponent by:
   computing the maximum of the absolute values for at least one of plurality of matrices or vectors;
   calculating a leading one position based on loge of the maximum of the absolute values; and
   selecting the common respective exponent as the leading one position less the width of the mantissas plus two.

16. An apparatus, comprising:
   a processor configured to implement a neural network; and
   a memory configured to store node values for at least a portion of the neural network, at least two of the node values comprising a respective mantissa and sharing a common exponent stored in the memory;
   wherein the processor is further configured to perform operations for the neural network using the stored node values, the operations comprising:
   updating the common exponent by repeatedly performing successive operations on at least one matrix and determining an expected value for successive elements of the at least one matrix, thereby producing an updated common exponent, producing an updated matrix having a block floating-point (BFP) representation including at least one value determined by shifting a mantissa according to the common exponent, and storing the updated common exponent in the memory.

17. The apparatus of claim 16, wherein the memory comprises at least one sub-unit of memory, which comprises at least one of: an array of latches, an array of flip-flops, a register file, a block random access memory, a first-in first-out (FIFO) buffer, or a shift register; and the successive elements are stored in the sub-unit of memory to be used in the determining the expected value.

18. The apparatus of claim 16, wherein the memory stores a running sum for the successive elements.

19. The apparatus of claim 16, further comprising a sequencer to control performance of the operations.

20. The apparatus of claim 16, further comprising:

an exponent adder configured to add a vector exponent to a matrix exponent and output a result exponent;

an output exponent selector coupled to receive the result exponent from the exponent adder and to perform the updating the common exponent, thereby outputting the common exponent; and an output mantissa shifter coupled to receive the updated common exponent from the output exponent selector and configured to use the updated common exponent to perform the shifting the mantissa for producing the updated matrix.

21. The apparatus of claim 16, wherein at least one of the processor or the memory is implemented using at least one of: a vector processor, a custom integrated circuit, an application-specific integrated circuits (ASIC), a field programmable gate arrays (FPGA), a reconfigurable logic device, a graphics processing unit (GPU), a neural networking processor, or a digital signal processing component.

22. A computer-readable storage device storing computer-readable instructions, which when executed by a reconfigurable logic device, processor, or neural network component, cause the processor to implement a method to implement neural network training or evaluation, the instructions comprising:

instructions to perform operations initiated by execution of a single instruction multiple data (SIMD) or vector instruction, the operations being performed with an integer array multiplier, the operations producing at least one matrix having a block floating-point (BFP) representation including a block of values having mantissas and sharing a common exponent;

instructions to store rolling values based on a first maximum absolute value of the mantissas for the block;

instructions to predict a second maximum absolute value for a next iteration of performing operations based on at least one of: the first maximum absolute value, a standard deviation of the stored rolling values, a mean of the stored rolling values, or the common exponent;

instructions to, based on the predicted second, maximum absolute value, adjust the common exponent;

instructions to produce an updated matrix having a block floating-point (BFP) representation including one or more values from the at least one matrix, at least one of the values having a mantissa shifted according to the adjusted common exponent;

instructions to store mantissa values for the updated matrix in a random access memory; and instructions to store the common exponent in registers or flip-flops.

23. The computer-readable storage device of claim 22, wherein the instructions to adjust the common exponent further comprise instructions to determine an expected value for squares of the successive elements of the at least one matrix.

24. The computer-readable storage device of claim 22, wherein the common exponent is adjusted based on a confidence interval determined for the successive elements.

25. The computer-readable storage device of claim 22, wherein the instructions to adjust the common exponent comprise instructions to compute an error magnitude and compare the computed error magnitude to determine whether to adjust the common exponent from a previous common exponent for the successive elements of the at least one matrix.

26. The computer-readable storage device of claim 22, wherein the common exponent applies to all of the values stored in the at least one matrix.

27. The computer-readable storage device of claim 22, wherein the common exponent is adjusted by checking for an overflow or underflow condition and adjusting the common exponent to avoid or minimize the overflow condition or the underflow condition.

28. The computer-readable storage device of claim 22, further comprising instructions to store the updated matrix in a computer-readable storage device or memory.

29. The computer-readable storage device of claim 22, where the mantissas are 16-bit mantissa and the common exponent is 5-bit.

30. The computer-readable storage device of claim 22, further comprising:

Instructions to detect an overflow or underflow condition for the mantissas sharing a common exponent in the matrix and, responsive to the detecting:

Instructions to shift mantissas in the matrix according to the overflow or underflow condition.

31. The computer-readable storage device of claim 30, further comprising:

instructions to, responsive to the detecting, clear the rolling values.

* * * * *